United States Patent [19]  [11] Patent Number: 5,083,260
Tsuchiya  [45] Date of Patent: Jan. 21, 1992

[54] BUS ARBITRATION SYSTEM FOR CONCURRENT USE OF A SYSTEM BUS BY MORE THAN ONE DEVICE

[75] Inventor: Haruhiko Tsuchiya, Sagamihara, Japan

[73] Assignee: PFU Limited, Ishikawa, Japan

[21] Appl. No.: 315,888

[22] Filed: Feb. 27, 1989

[30] Foreign Application Priority Data

Feb. 29, 1988 [JP] Japan ............... 63-047822

[51] Int. Cl.⁵ ............................ G06F 13/364
[52] U.S. Cl. ................... 395/325; 364/240; 364/240.1; 364/240.2; 364/240.5; 364/242.6; 364/242.7; 364/242.92; 364/DIG. 1
[58] Field of Search ... 364/200 MS File, 900 MS File

[56] References Cited

U.S. PATENT DOCUMENTS

| 4,038,644 | 7/1977 | Duke et al. | 364/900 |
|---|---|---|---|
| 4,417,303 | 11/1983 | Korowitz et al. | 364/200 |
| 4,466,055 | 8/1984 | Kinoshita et al. | 364/200 |
| 4,493,036 | 1/1985 | Boudreau et al. | 364/200 |
| 4,554,628 | 11/1985 | Bell | 364/200 |
| 4,559,595 | 12/1985 | Boudreau et al. | 364/200 |
| 4,570,220 | 2/1986 | Tetrick et al. | 364/200 |
| 4,600,992 | 7/1986 | Boudreau et al. | 364/200 |
| 4,608,631 | 8/1986 | Stiffler et al. | 364/200 |
| 4,646,237 | 2/1987 | Allen | 364/200 |
| 4,654,788 | 3/1987 | Boudreau et al. | 364/200 |
| 4,667,305 | 5/1987 | Dill et al. | 364/900 |
| 4,803,617 | 2/1989 | Berarducci | 364/200 |
| 4,821,174 | 4/1989 | Webb et al. | 364/200 |
| 4,837,739 | 6/1989 | McGill et al. | 364/900 |

FOREIGN PATENT DOCUMENTS 56-132624 10/1981 Japan.

OTHER PUBLICATIONS

Digital Equipment Corp., "pdp11 peripherals handbook", pp. 5-6~5-8, 1976.
Motorola Inc., "MC68020 32-Bit Microprocessor User's Manual" pp. 5-1~5-5, 1985.

Primary Examiner—Gareth D. Shaw
Assistant Examiner—Matthew C. Fagan
Attorney, Agent, or Firm—Armstrong, Nikaido, Marmelstein, Kubovcik & Murray

[57] ABSTRACT

A bus arbitration system is disposed between a plurality of devices for granting use of a bus having a data bus size larger than a port size of each of the plurality of devices. A plurality of partial buses are made from the full size bus. Each of the partial buses has a data bus size equal to the corresponding port size of the devices, and each of the devices is connected to one of the partial buses through a corresponding port unit. An arbitration between the plurality of devices for granting use of the bus is carried out for each partial bus through the corresponding port unit.

4 Claims, 17 Drawing Sheets

- LVA
- LVB
- UPS
- OUT
- START

- ADDRESS

- NUMBER OF TRANSFERRED DATA

- END

- WORD 1
- WORD 2
- WORD 3
- WORD 4

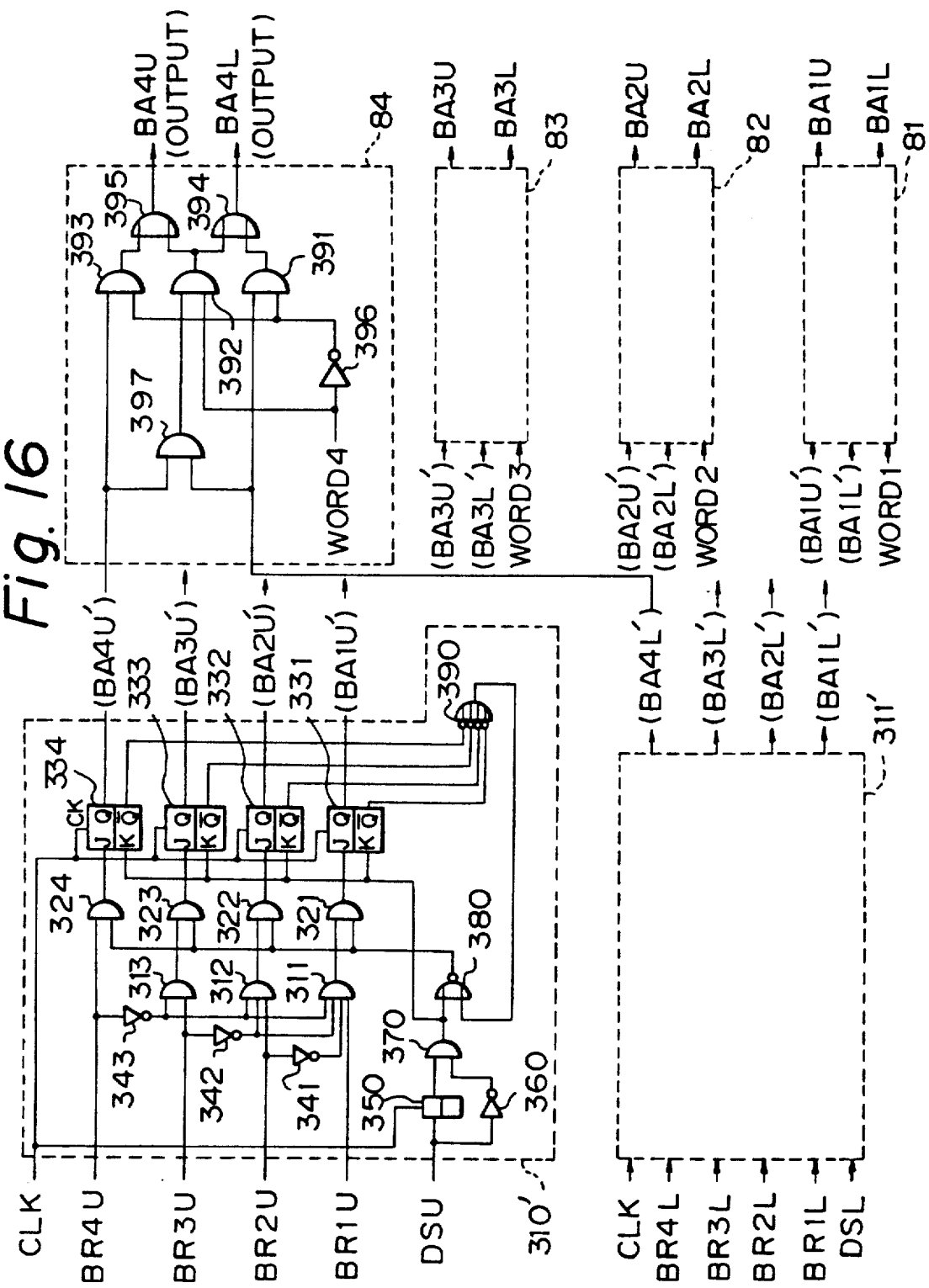

BUS ARBITRATION SYSTEM FOR CONCURRENT USE OF A SYSTEM BUS BY MORE THAN ONE DEVICE

BACKGROUND OF THE INVENTION

(1) Field of the Invention

The present invention relates to a bus arbitration system used between a plurality of devices for granting use of a bus having a data bus size larger than a port size of each of the plurality of devices.

(2) Description of the Related Art

Generally, in computer systems, a strong demand exists for increased capacity and speed of data transfer in a bus system.

In the prior art, speeding up of data transfer was carried out by, for example, (1) using a high-speed clock for controlling timing of operation, (2) increasing an amount of data transferred at one time, and (3) improving an efficiency of proccessing by eliminating idle time.

Generally, in a system wherein a plurality of devices are connected to a bus, when requests to use the bus are made by more than one of the devices at the same time, arbitration is carried out between the devices, to determine use of the bus, by a bus arbiter. In such a system, a device having requested use of the bus, but not yet granted use by the bus arbitration, must wait until any other device which has been granted use of the bus by the bus arbitration, is finished.

Generally, however, each device connected to a bus has an individual port size (number of data signal lines used for data input/output, i.e., number of bits of a data input/output port), for example, 8 bits, 16 bits, or 32 bits, and naturally the data bus size (number of data lines) in a bus is equal to or larger than the maximum port size of the devices connected to the bus.

In the prior art, the bus arbitration is carried out only for use of the whole data bus. Therefore, for example, in a system wherein a plurality of devices are connected to a bus having a data bus size of 32 bits, and devices have port sizes of 8 bits, 16 bits, and 32 bits, respectively, while one of the devices having a port size of 8 bits is using the bus, the other devices having port sizes of 8 bits, and 16 bits, and 32 bits, respectively, must wait until the device is through using the bus. Namely, during the use of the bus by the 8 bit device, since only 8 bits of the 32 bits bus are actually used, the other 24 bits of the bus are actually in an idle state. This means that in the prior art, the efficency of data transfer is very low when a plurality of devices are connected to a bus, each of the devices having a port size smaller than the bus size.

SUMMARY OF THE INVENTION

The object of the present invention is to provide a bus arbitration system between a plurality of devices using a bus having a data bus size larger than the port size of each of the plurality of devices, whereby the whole bus can be efficiently used for data transfer by the plurality of devices.

According to the present invention, there is provided a bus arbitration system between a plurality of devices using a bus having a port size larger than a port size of each of the plurality of devices. The system comprises a plurality of partial buses, a plurality of port units, and an arbitration device. Each of the plurality of partial buses comprises a portion of the signal lines of the bus, each portion used exclusively as a partial bus. Each of the partial buses are capable of being used as an individual bus. The combination of all of the partial data buses is equal in size to the data bus. The system comprises a plurality of port units and an arbitration device. Each of the plurality of port units is connected, on one side, to a corresponding one of the plurality of partial buses. The port size of each port unit is equal to the data bus size of the corresponding one of the partial buses to which it is connected. Each of the plurality of port units is connected, on the other side, to a corresponding one of the plurality of devices. The port size of each port unit is equal to the port size of the corresponding one of the plurality of devices to which it is connected. The arbitration device comprises a plurality of partial bus arbitration device, each of which is provided for a corresponding one of the partial bus. Each of the plurality of partial bus arbitration device arbitrates between a part of the plurality of port units which are connected to the partial bus corresponding to its own partial bus arbitration device, for granting use of the corresponding partial bus. Each of the port units sends a bus request signal, identifying its own port unit, to one of the partial bus arbitration device provided for the partial bus to which the unit is connected, when receiving a request for use of the bus from the device which is connected to the own port unit. Each of the plurality of partial bus arbitration device then carries out the arbitration, and sends a grant signal granting use of the corresponding partial bus, to one of the port units which sent the bus request signal to the partial bus arbitration device.

BRIEF DESCRIPTION OF THE DRAWINGS

In the drawings:

FIG. 16 shows a construction realizing the internal bus arbiter 300 in the construction of FIG. 8;

DESCRIPTION OF THE PREFERRED EMBODIMENTS

Figure 1:
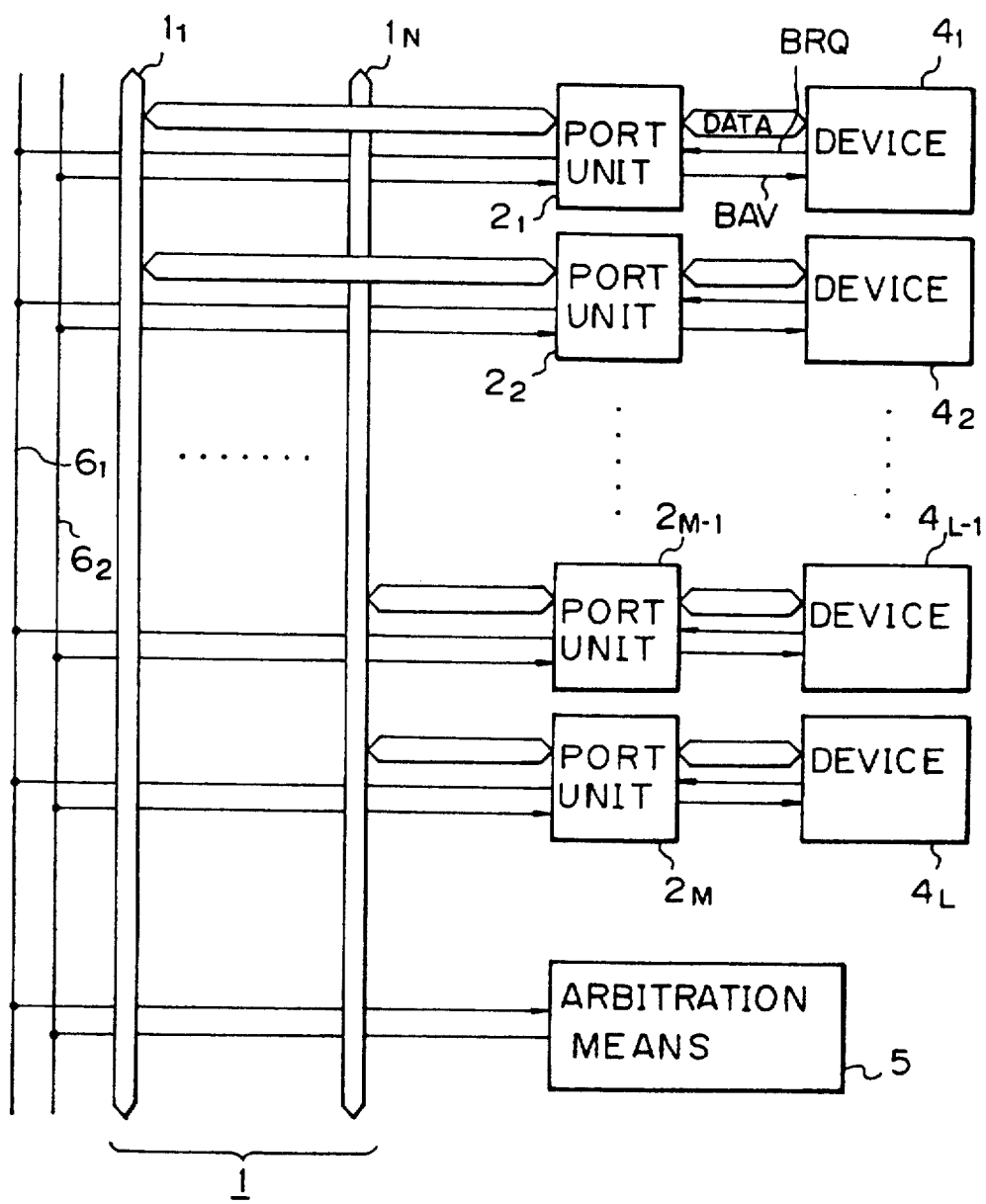
FIG. 1 shows a block diagram of the basic construction of the first embodiment of the present invention.
Figure 2:
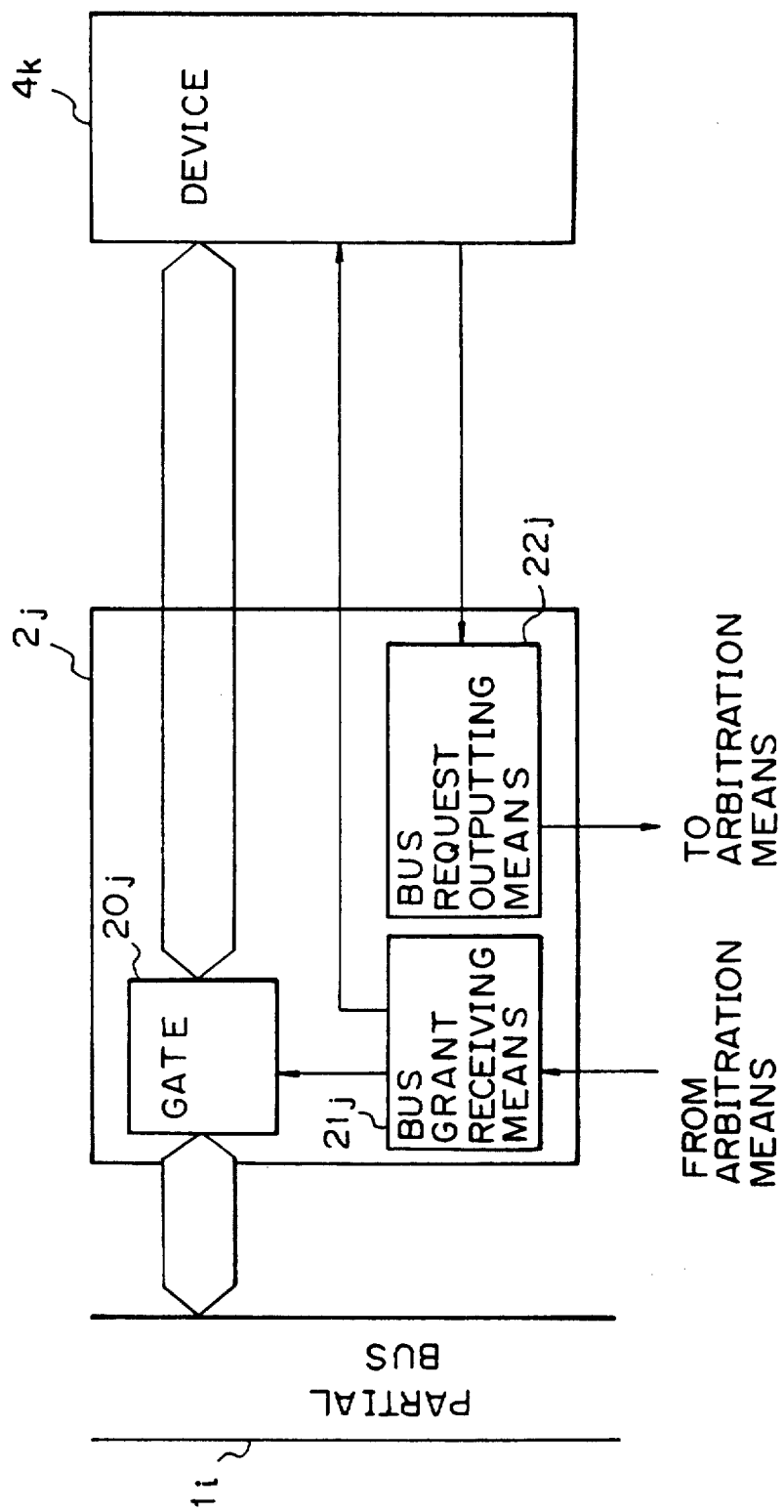
FIG. 2 shows a block diagram of the port unit in the construction of FIGS. 1 and 4.
Figure 3:
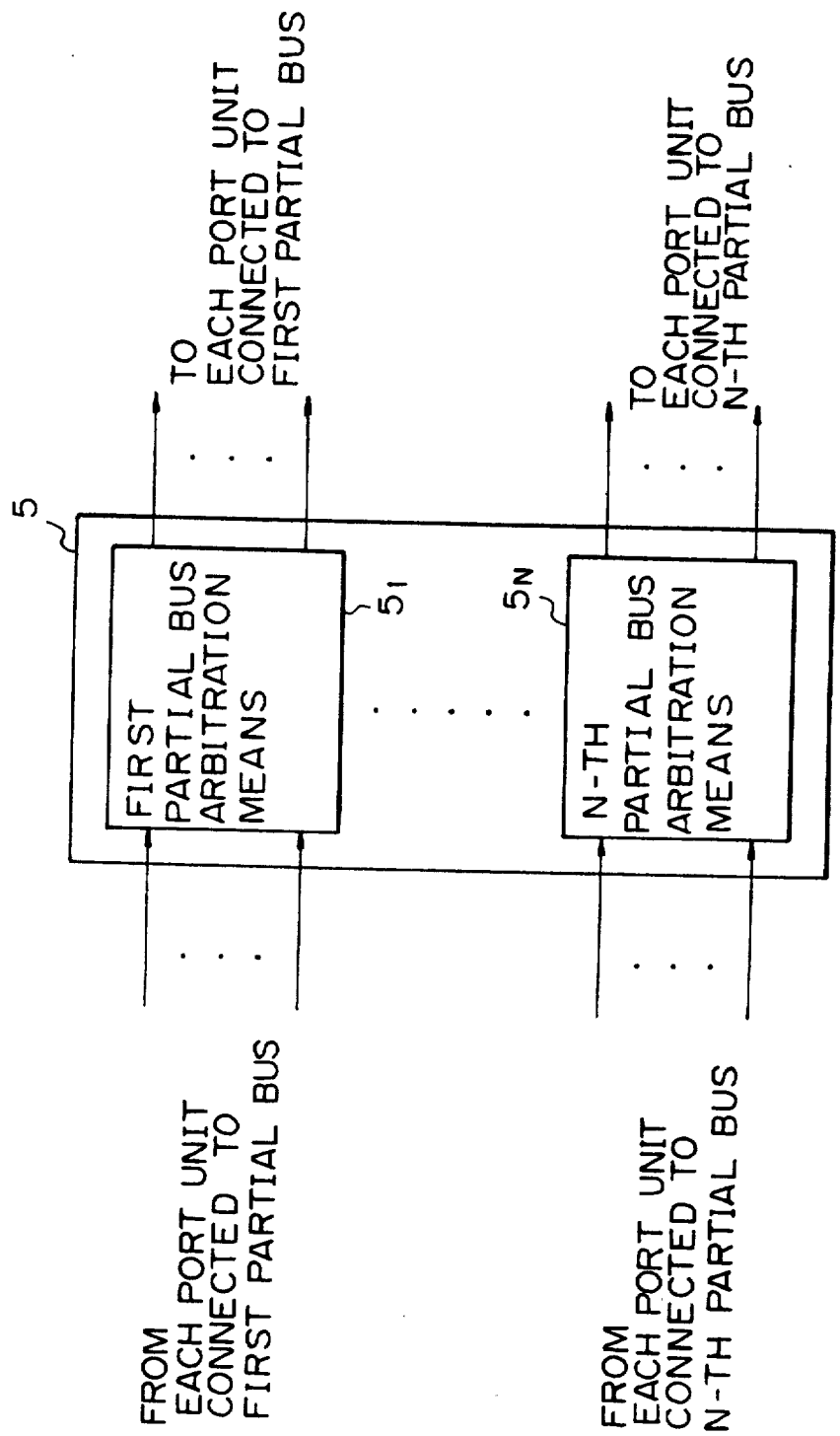
FIG. 3 shows a block diagram of the arbitration means in the construction of FIG. 1.

FIGS. 1, 2, and 3 are block diagrams showing the basic construction of the first embodiment of the present invention.

In FIG. 1, reference numeral 1 denotes a bus (i.e., system bus), and $1_1 \sim 1_n$ denote partial buses, $2_1 \sim 2_m$ denote port units, $4_1 \sim 4_L$ denote devices which use the bus 1, 5 denotes an arbitration means, and $6_1$ and $6_Z$ denote control lines.

Each of a plurality of partial buses $1_1 \sim 1_N$ comprises a portion of the signal lines of the bus 1, which portion is used exclusively for each partial bus, and each of the partial buses $1_1 \sim 1_N$ can be used as an individual bus, and the sum of the data bus sizes of all of the partial buses $1_1 \sim 1_N$ equals the data bus size of the bus 1.

Each of the port units $2_1 \sim 2_M$ is connected, on one side, to a corresponding one of the partial buses $1_1 \sim 1_N$, the port size of each port unit being equal to the data bus size of the corresponding one of the partial buses which is connected to the port unit, and each of the port units $2_1 \sim 2_M$ is connected, on the other side, to a corresponding one of the devices $4_1 \sim 4_L$ the port size of each port unit being equal to the port size of the corresponding one of the devices which is connected to the port unit.

Namely, each of the devices $4_1 \sim 4_L$ is connected to the bus 1 through a corresponding one of the port units $2_1 \sim 2_M$.

Each of the port units $2_1 \sim 2_M$ is connected to an arbitration means 5 through the control lines $6_1$ and $6_Z$.

In FIG. 2, a block diagram of the port unit $2_j$ (j = 1 ~ M) used in FIG. 1 is shown. In FIG. 2, a port unit $2_j$ (j = 1 ~ M) is connected to one of the devices $4_k$ (k = 1 ~ L) on one side, and is connected to one of the partial buses $1_i$ (i = 1 ~ N) on the other side.

The port unit $2_j$ comprises a gate $20_j$, a bus grant receiving means $21_j$, and a bus request outputting means $22_j$.

FIG. 3 is a block diagram of the arbitration means 5 used in FIG. 1.

As shown in FIG. 3, the arbitration means 5 in FIG. 1 comprises first to N-th partial bus arbitration means $5_1 \sim 5_N$.

Each of the first to N-th partial bus arbitration means $5_1 \sim 5_N$ is provided in correspondence with one of the partial buses $1_1 \sim 1_N$, and carries out arbitration between the port units which are connected to the corresponding partial bus, for granting use of the corresponding partial bus.

Each of the port units $2_1 \sim 2_M$ sends a bus request signal, identifying itself, to one of the partial bus arbitration means $5_1 \sim 5_N$ which was provided for the partial bus to which the port unit is connected, when receiving a request for use of the bus 1 from the device which is connected to its own port unit.

Each of the plurality of partial bus arbitration means $5_1 \sim 5_N$ carries out the arbitration, and sends a grant signal which grants use of the corresponding partial bus, to one of the port units which sent the bus request signal to its own partial bus arbitration means.

The gate $20_j$ is located in the data path connecting the device $4_k$ which is connected to one port unit and the partial bus $1_i$ to which the port unit is connected.

The bus grant receiving means $21_j$ opens the gate $20_j$, when receiving the signal granting use of the partial bus $1_i$ to which its own port unit is connected.

According to the construction mentioned above, arbitration is carried out individually for use of each of the partial buses comprising a portion of the signal lines of the bus 1. Therefore, each partial bus $1_i$ can be used individually by a device $4_k$ having a port size equal to (or smaller than) the data bus size of the partial bus $1_i$, when a bus grant has been obtained from the corresponding partial bus arbitration means $5_i$ through a port unit $2_j$, i.e., the bus can be used by a plurality of devices at the same time. Thus the efficiency of the data transfer can be greatly improved over the prior art as mentioned before.

Figure 4:
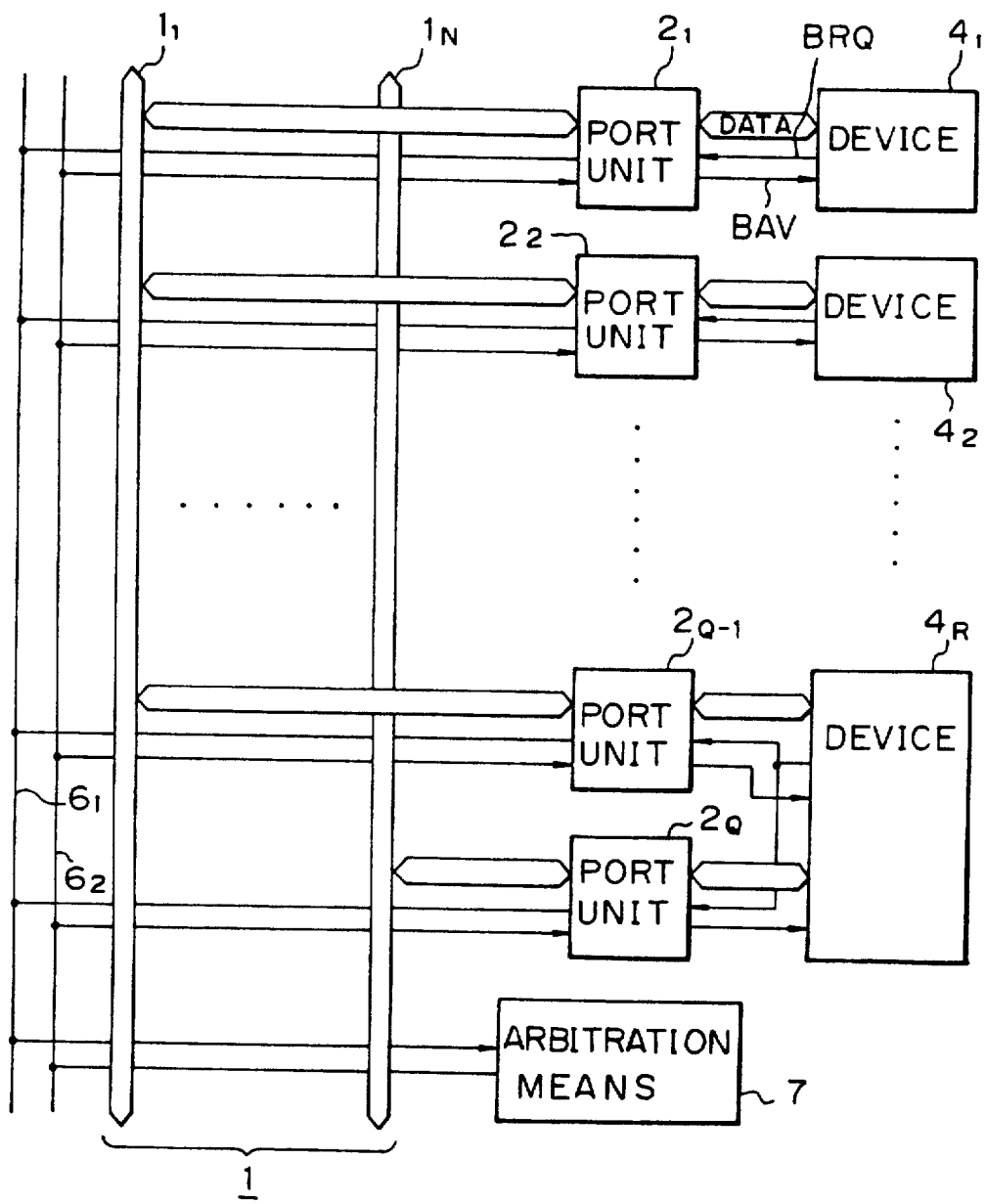
FIG. 4 shows a block diagram of the basic construction of the second embodiment of the present invention.

FIG. 4 is a block diagram of the basic construction of the second embodiment of the present invention.

In FIG. 4, reference numeral 1 denotes a bus (i.e., system bus), $1_1 \sim 1_N$ denote a partial buses, and $6_1$ and $6_2$ denote control lines. Reference numerals $2_1 \sim 2_Q$ denote port units, $4_1 \sim 4_R$ denote devices which use the bus 1, and 7 denotes an arbitration means.

The components denoted by the same references in FIG. 4, function the same as in FIG. 1.

Similar to the first embodiment, each of the plurality of port units $2_1 \sim 2_Q$ is connected, on one side, to one of the plurality of partial buses $1_1 \sim 1_N$, the port size of each port unit being equal to the data bus size of the above one of the partial buses which is connected to its corresponding port unit.

However, in the second embodiment of the present invention shown in FIG. 4, each of the devices $4_1 \sim 4_R$ is connected to a corresponding one or more of the plurality of port units $2_1 \sim 2_Q$ on the other side of the one or more of the above plurality of port units $2_1 \sim 2_Q$ so that the port size of each device equals the total port size of the corresponding one or more of the plurality of port units $2_1 \sim 2_Q$ which are connected to each device.

Each of the port units $2_1 \sim 2_Q$ has the same construction as shown in FIG. 2, and similar to the first embodiment, each of the port units $2_1 \sim 2_Q$ sends a bus request signal identifying itself unit to one of the partial bus arbitration means $5_1 \sim 5_N$ which was provided for the partial bus to which the port unit is connected, when receiving a request for use of the bus 1 from the device which is connected to the port unit.

Figure 5:
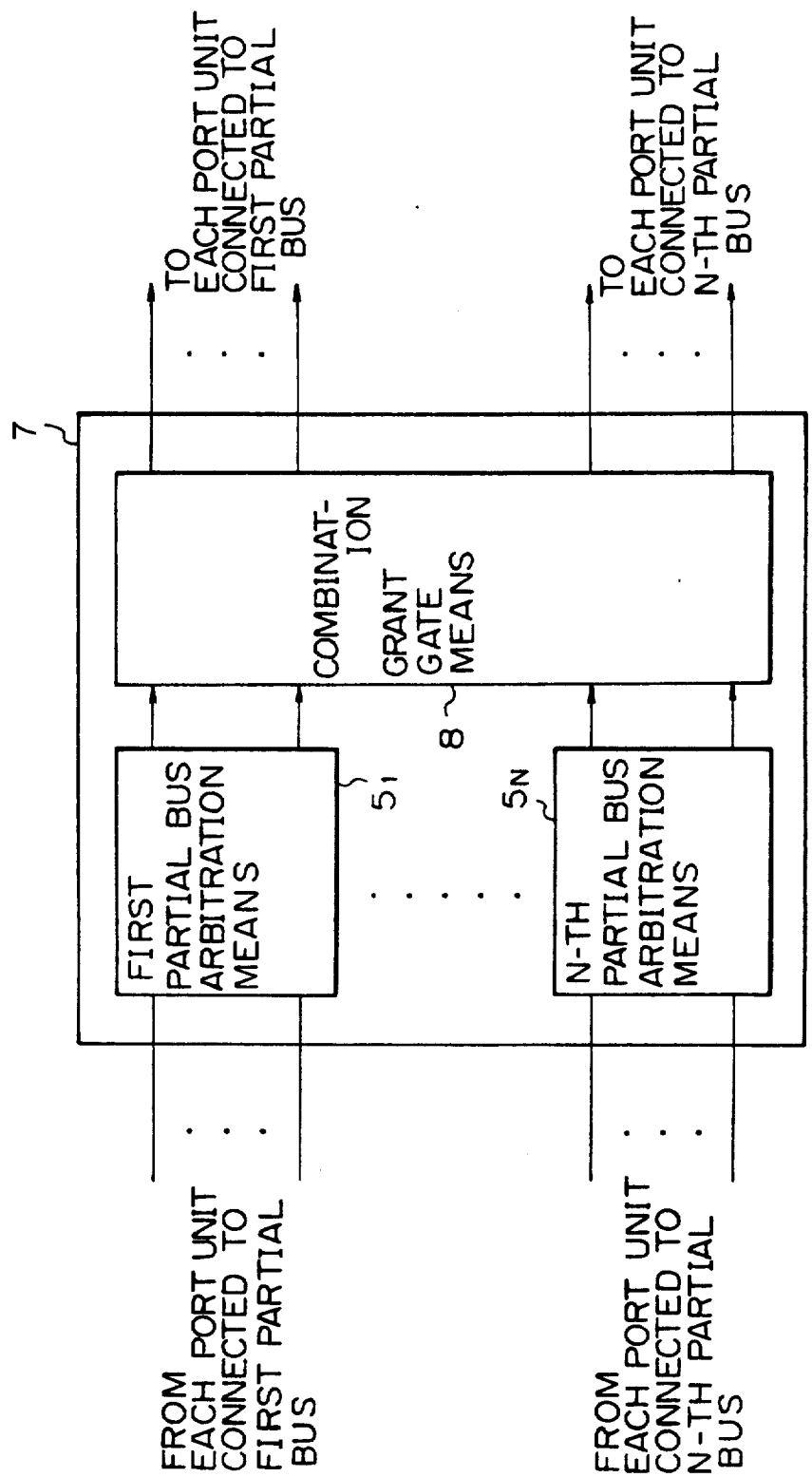
FIG. 5 shows a block diagram of the arbitration means in the construction of FIG. 4.

FIG. 5 is a block diagram of the arbitration means in the construction of FIG. 4.

The arbitration means 7 in the second embodiment of the present invention comprises a plurality of partial bus arbitration means $5_1 \sim 5_N$, each of which is provided for one of the partial buses, and each of the plurality of partial bus arbitration means $5_1 \sim 5_N$ arbitrates between a part of the plurality of port units which are connected to the partial bus corresponding to its own partial bus arbitration means, for granting use of the corresponding partial bus.

Each of the plurality of partial bus arbitration means $5_1 \sim 5_N$ carries out arbitration, and outputs a grant signal which grants use of the corresponding partial bus, for one of the port units which sent the bus request signals to the partial bus arbitration means.

The arbitration means 7 in the second embodiment of the present invention further comprises a combination grant gate means 8 in which a combination of port units can be set so as to allow the grant signals to be output to the combination of port units for a bus request from a device which is connected to the combination of port units, only when the grant signals for both of the combination of port units are simultaneously output in the corresponding combination of partial bus arbitration means.

According to the second embodiment of the present invention as mentioned above, as shown in FIG. 4, some of the data lines comprising the total port size of a device $4_R$ can be connected through a port unit $2_{Q-1}$ to one of the partial buses, and other lines of the device $4_R$ can be connected through another port unit $2_Q$ to another partial bus. More generally, the total port size of a device can be separated to a plurality of groups of lines, and each group being connected through a corresponding one of the port units to a corresponding one of the partial buses. When the device outputs a request for use of the bus 1 to all the port units connected to the device, each of the port units connected to the device sends a bus request for use of a corresponding partial bus to the corresponding partial bus arbitration means. Then, only when all the partial bus arbitration means which received the above bus requests from the port units connected to the device output corresponding grants, the combination grant gate means 8 allows these grants to be sent to the corresponding port units. These grants are then transferred to the device, and thus, the device can use a portion of the data bus 1 having a size equal to the total port size.

Figure 6:
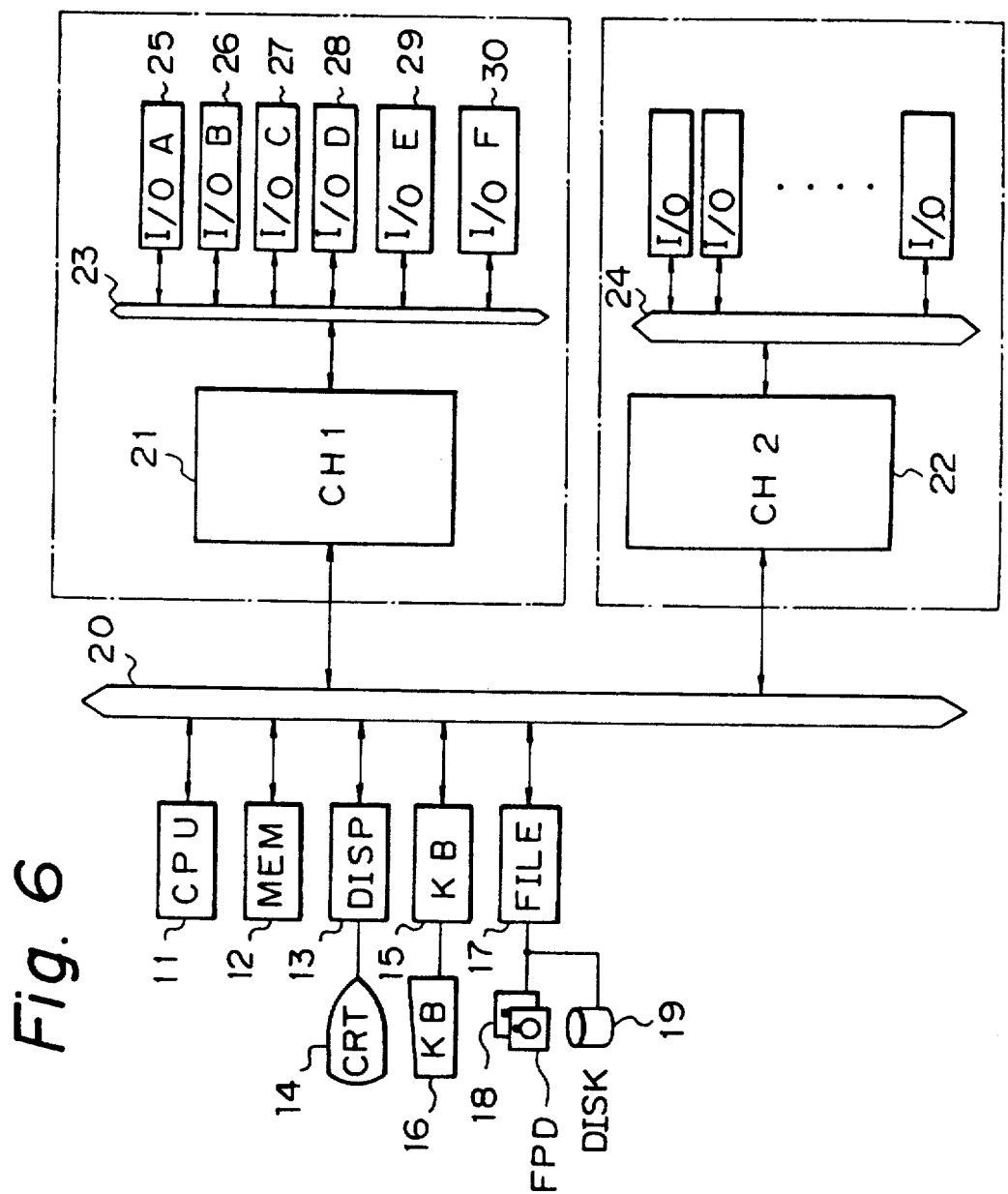
FIG. 6 shows a block diagram of the components constituting the construction of a computer system connecting two groups of I/O devices through corresponding channel units as an example of a system to which the second embodiment of the present invention is applied.

FIG. 6 is a block diagram of the components constituting the construction of a computer system connecting two groups of I/O devices through corresponding channel units as an example of a system to which the second embodiment of the present invention is applied.

In FIG. 6, reference numeral 11 denotes a central processing unit (CPU), 12 denotes a memory, 13 denotes a display controller, 14 denotes a CRT display device, 15 denotes a keyboard controller, 16 denotes a keyboard, 17 denotes a file controller, 18 denotes a floppy disk device, 19 denotes a magnetic disk device, 20 denotes a main bus, 21 and 22 denote channel units, 23 and 24 denote I/O buses, and 25 to 30 denote I/O devices.

The main bus 20 includes, for example, a 16 bit or 32 bit data bus, and the CUP 11, the memory 12, the display controller 13, the key-board controller 15, and the file controller 17, are connected to the main bus. Each of the two groups of I/O devices 25~30 are connected to the main bus 20 through the corresponding channel units 21, 22 and the I/O buses 23, 24.

Figure 7:
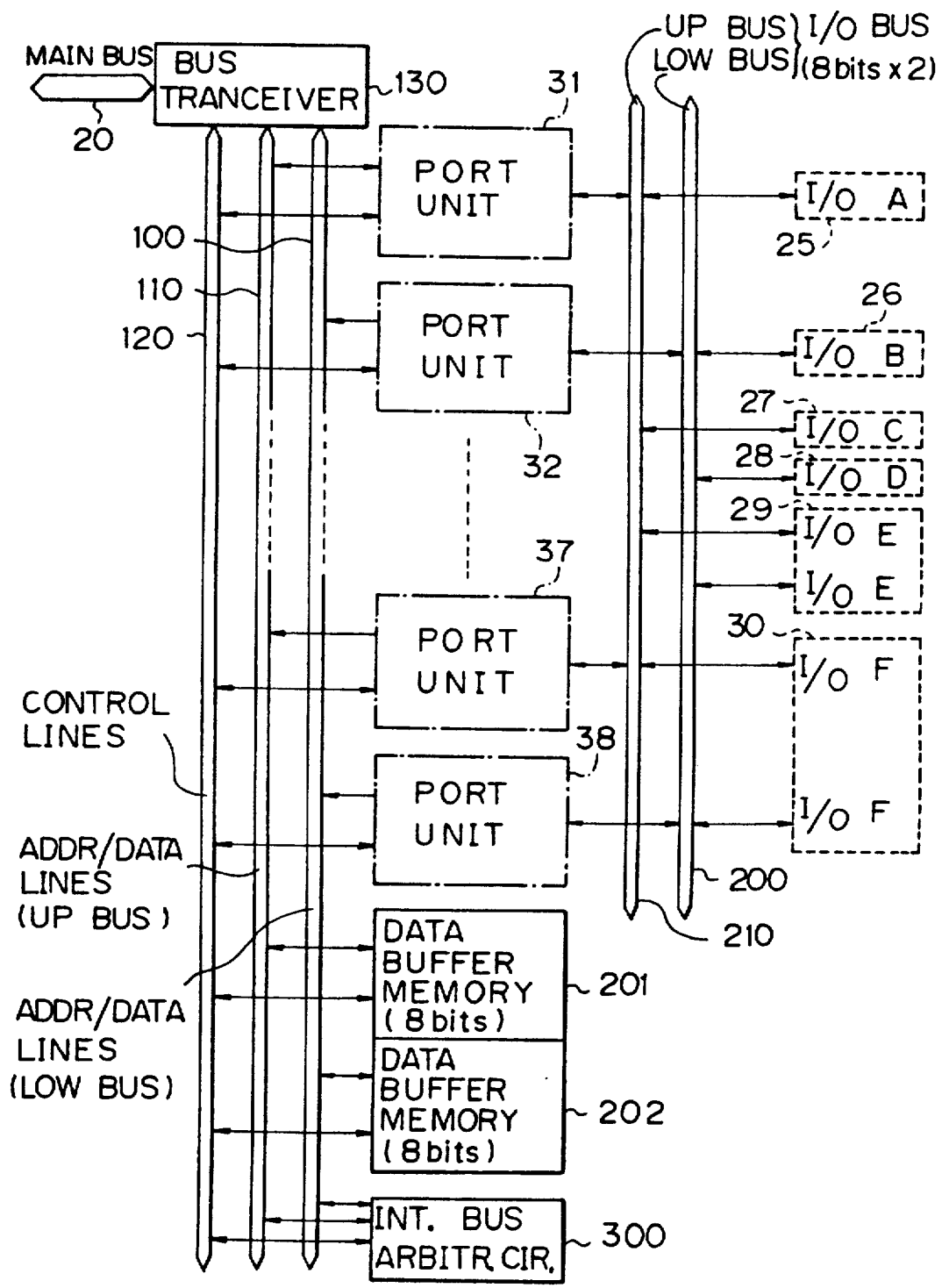
FIG. 7 shows a block diagram of the channel unit 21 and the I/O bus 23.

FIG. 7 is a block diagram of the channel 21 and the I/O bus 23.

In FIG. 7, reference numeral 100 denotes a lower side of an address/data bus (a less significant bit side of signal lines for transferring addresses and data, hereinafter called a LOW bus), 110 denotes an upper side of an address/data bus (a more significant bit side of signal lines for transferring addresses and data, hereinafter called an UP bus), 120 denotes control lines, 130 denotes a bus tranceiver, 31 to 38 denote port units, 201 and 202 denote data buffer memories, and 300 denotes an internal bus priority control circuit (internal bus arbiter), and all these are the main components of the channel 21 in FIG. 6.

In FIG. 7, the I/O bus 23 in FIG. 6 is shown separated into a lower side 200 (a less significant bit side of signal lines for transferring addresses and data to and from the I/O devices 25 to 30, and hereinafter called a LOW I/O bus) and an upper side 210 (a more significant bit side of signal lines for transferring addresses and data to and from the I/O devices 25 to 30, and hereinafter called an UP I/O bus).

The LOW bus 100 and the UP bus 110 each have, for example, a data bus size of 8 bits when the data bus size of the main bus 20 is 16 bits, and the LOW bus 100, the UP bus 110, and the control lines 120 are connected to the main bus 20 through the bus tranceiver 130.

The I/O devices 25 to 28 (each of these are also denoted by A, B, C, and D) each have a port size of 8 bits, and I/O devices 29 and 30 (each of these are also denoted by E and F) each have a port size of 16 bits.

The I/O devices 25 and 27 (A and C) are connected to the UP I/O bus 210, the I/O devices 26 and 28 (B and D) are connected to the LOW I/O bus 200, and the I/O devices 29 and 30 (E and F) each are connected to both the UP I/O bus 210 and the LOW I/O bus 200, wherein the upper half (8 bits) of the port of each of the I/O devices 29 and 30 (E and F) is connected to the UP I/O bus 210, and the lower half (8 bits) of the port of each of the I/O devices 29 and 30 (E and F) is connected to the LOW I/O bus 200.

Figure 8:
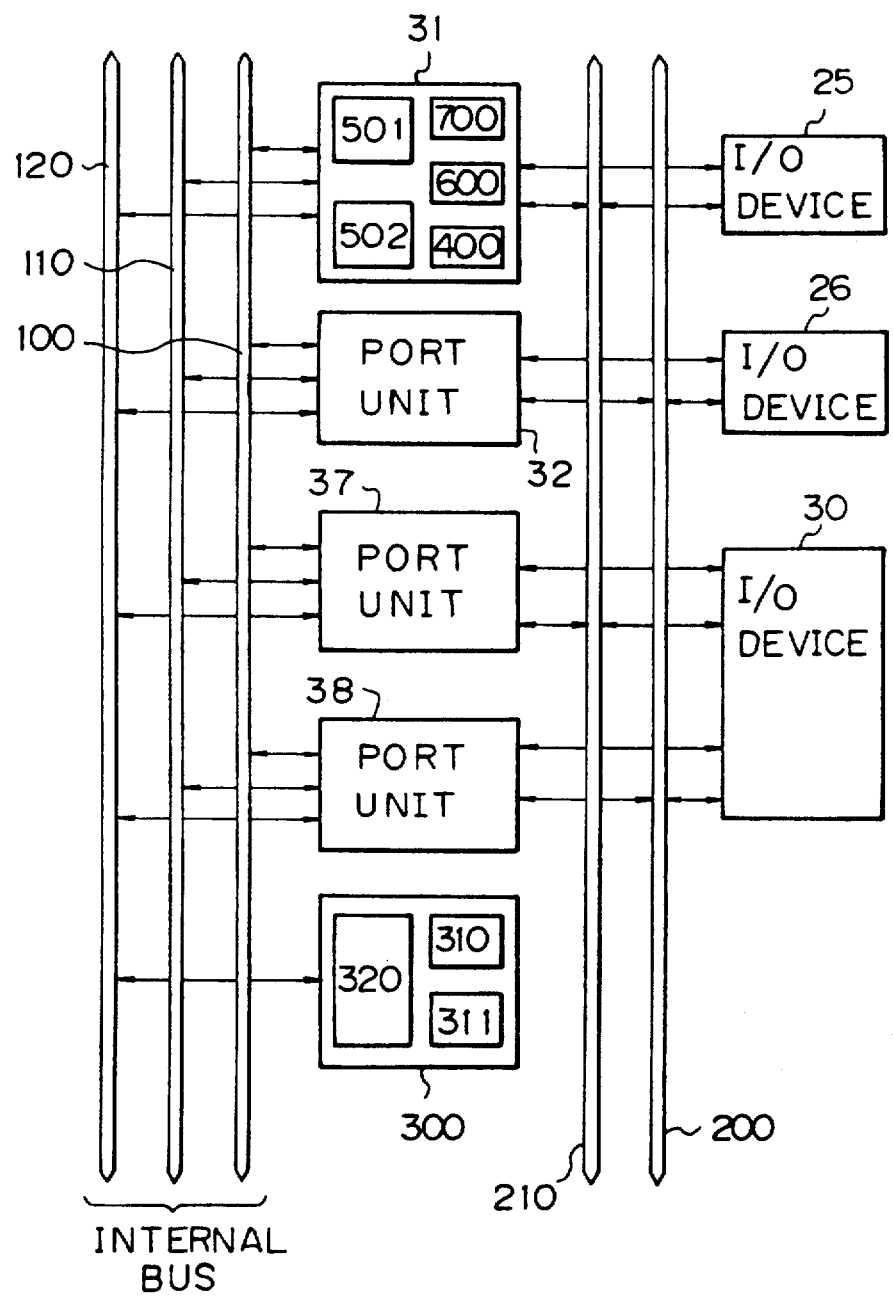
FIG. 8 shows a block diagram of the port units and the internal bus arbiter in the construction of FIG. 7.

FIG. 8 is a block diagram of the port units and the internal bus arbiter 300 in the construction of FIG. 7.

Each of the port units, for example, the port unit 31 comprises a two-way buffer circuit for an upper side 501, and a two-way data buffer circuit for a lower side 502, an access control circuit 400, a DMA sequential control circuit 600, and an operation mode register means 700.

The operation mode register means 700 holds: (1) priority level information represented by two bits LVA and LVB (for example, (LVA, LVB)=(0, 1) indicates level 1, (LVA, LVB)=(1, 0) indicates level 2, (LVA, LVB)=(1, 1) indicates level 3, and (LVA, LVB)=(O, O) indicates level 4), which is used in the bus arbitration, and is assigned to itself (is actually assigned to the I/O device connected to the port unit) by the CPU 11; (2) information indicating use of a partial bus has been requested by itself, i.e., which indicates whether the port unit itself is requesting to be connected to the UP bus 110 or the LOW bus 100, and which is represented by one bit UPS (for example, UPS="0" indicates the LOW bus 100, and UPS="1" indicates the UP bus 110); and (3) information of the direction of data transfer OUT, which shows whether the bus is requested to be used for data input or output.

The two-way data buffer circuit for an upper side 501 and the two-way data buffer circuit for a lower side 502 realize the aforementioned gate $20_1 18$ $20_Q$ in FIG. 2. is connected, on one side, to an UP or LOW I/O bus 210 or 200, and is removably connected, on the other side, to the UP bus 110. The two-way data buffer circuit for a lower side 502 is connected, on one side, to an UP or LOW I/O bus 210 or 200, and is removably connected, on the other side, to the LOW bus 100.

The DMA sequential control circuit 600 controls operations of renewing an address and sending the address on the UP or LOW bus 110 or 100, and controls the above two-way data buffer circuits for an upper side 501 and a lower side 502.

The access control circuit 400 realizes the aforementioned bus request outputting means $22_1 \sim 22_Q$ and the bus grant receiving means $21_1 \sim 21_Q$ shown in FIG. 2. The access control circuit 400 outputs an internal bus request signal represented by 8 bits: BR1U, BR2U, BR3U, BR4U, BR1L, BR2L, BR3L, and BR4L (since the priority level is indicated by the two bits LVA and LVB in this example, the priority level is shown as 1, 2, 3, or 4; and the symbols which include "U", indicate a request for use of the UP bus 110, and the symbols which include "L", indicate a request for use of the LOW bus 100) on the control lines 120 when receiving a bus access request signal BRQ sent from the I/O device which is connected through the UP or LOW I/O bus 210 or 200 to the port unit in which the access control circuit 400 is situated, and the access control circuit 400 sends a bus access grant (acknowledge) signal BAV to the above I/O device which is connected through the UP or LOW I/O bus 210 or 200 to the port unit in which the access control circuit 400 is situated when receiving an internal bus grant signal represented by 8 bits: BA1U, BA2U, BA3U, BA4U, BA1L, BA2L, BA3L, and BA4L (wherein the meanings of the symbol 1, 2, 3, and 4, or U and L are the same as the above) from the internal bus arbiter (internal bus priority control circuit) 300 through the control lines 120.

The above internal bus request signal corresponds to a bus request signal in the abovementioned second embodiment of the present invention, and the abovementioned identification of itself is realized by showing the above priority level, because the priority level is uniquely assigned for each port unit by the CPU 11 as described later.

The internal bus arbiter 300 realizes the aforementioned arbitration means 7 in FIG. 5. The internal bus arbiter 300 comprises an arbitration mode register means 320, an internal bus arbiter for a lower side 310, and an internal bus arbiter for an upper side 311.

The arbitration mode register means 320 holds information which indicates whether the data transfer is carried out using both of the UP and LOW buses 110 and 100 or using only one of the UP and LOW buses 110 and 100, for each priority level.

The internal bus arbiter for a lower side 310 gives a grant to a port until the priority level of which is the highest among the port units which have sent a bus request, i.e., the internal bus arbiter for a lower side 310 makes one bit of the internal bus grant signal for a lower side BA1l, BA2L, BA3L, or BA4L ON, corresponding to the ON bit of the highest priority level among the 8 bits of the interanl bus request signal BR1L, BR2L, BR3L, and BR4L.

The internal bus arbiter for an upper side 311 gives a grant to a port unit the priority level of which is the highest among the port units which have sent a bus request, i.e., the internal bus arbiter for an upper side 311 makes on bit of the internal bus grant signal for an upper side BA1U, BA2U, BA3U, or BA4U ON, corresponding to the ON bit of the highest priority level among the 8 bits of the internal bus request signal BR1U, BR2U, BR3U, and BR4U.

Figure 9:
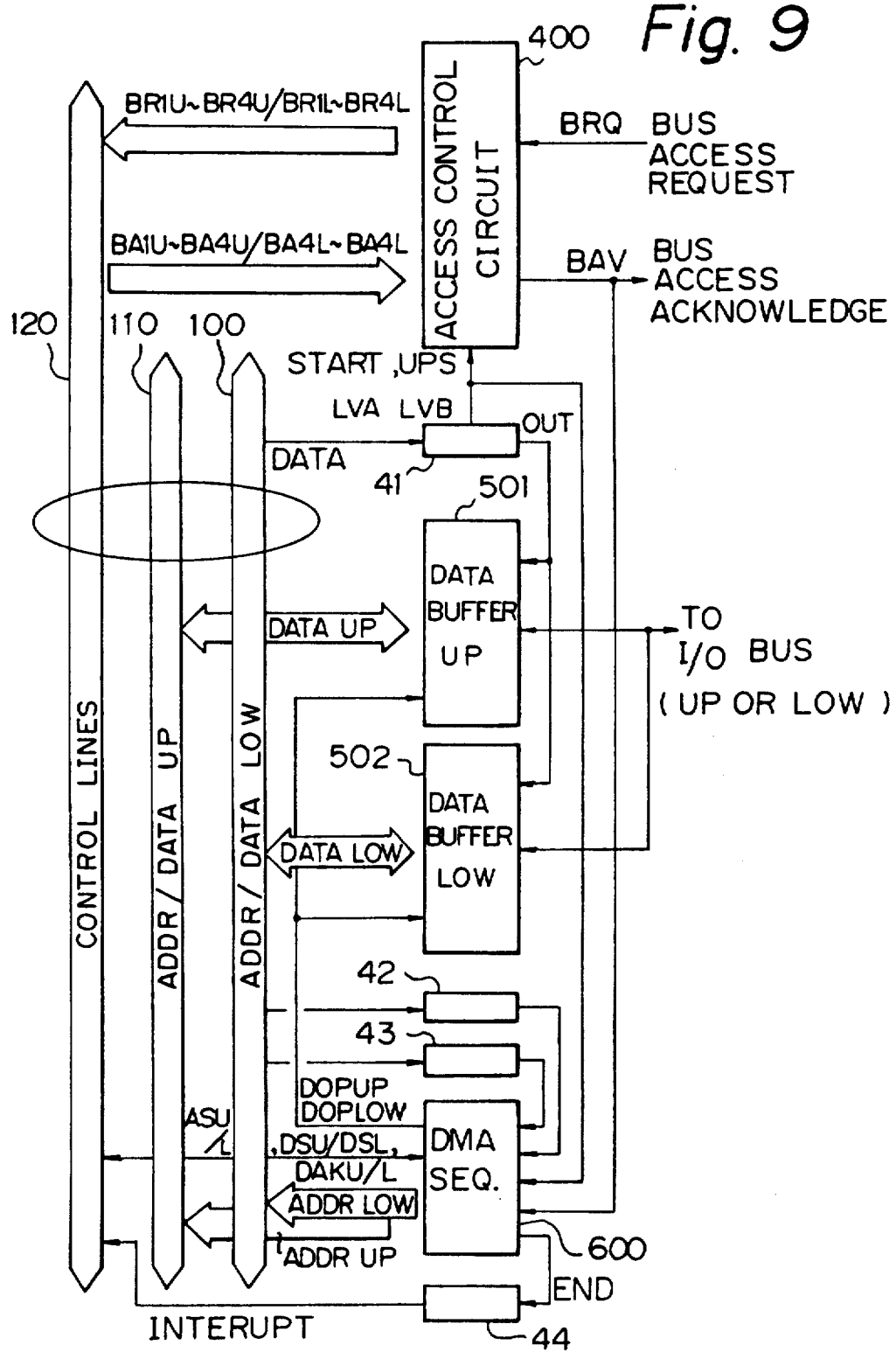
FIG. 9 shows the construction of the port units 31, 32, . . . 37, or 38 in FIGS. 7 and 8.

FIG. 9 shows the construction of the port units 31, 32, . . . 37, or 38 in FIGS. 7 and 8.

In FIG. 9, reference numerals 41, 42, 43, and 44 denote registers, and these registers realize the aforementioned operation mode register means 700. The other components denoted by the reference numerals 400, 501, 502, and 600 are the same as shown in FIG. 8.

The symbol START denotes a start signal, DOP UP and DOP LOW are each data buffer circuit control signals for controlling the two-way data buffer circuit for an upper side 501 and the two-way data buffer circuit for a lower side 502, respectively, ASU and ASL are each address strobe signals for an upper side and a lower side, respectively. DSU and DSL are each data strobe signals for an upper side and a lower side, respectively, and DAKU and DAKL are each data acknowledge signals for an upper side and a lower side, respectively.

FIGS. 10, 11, 12, and 13 each show a content of the registers 41, 42, 43, and 44 in the construction of FIG. 9.

Figure 10:
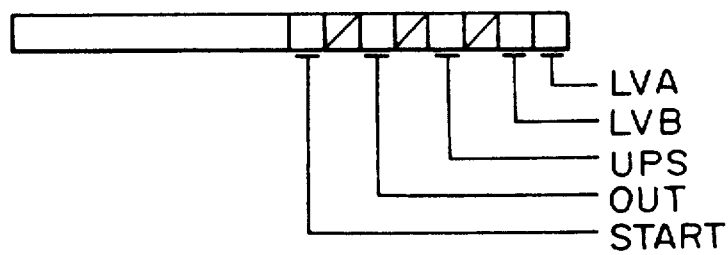
FIGS. 10, 11, 12, and 13 each show a content of the registers 41, 42, 43, and 44 in the construction of FIG. 9.
Figure 11:
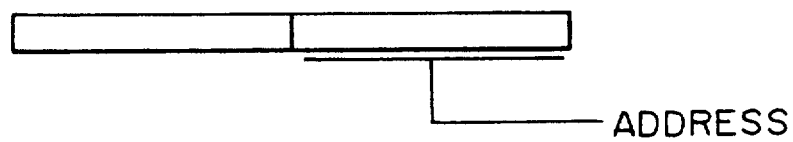

As shown in FIG. 9, register 41 holds the aforementioned information indicated by the symbols START, OUT, UPS, LVA, and LVB. As shown in FIG. 10, register 42 holds the aforementioned address information, which is denoted by a symbol ADDRESS. As shown in FIG. 11, register 43 holds a number of the data (byte) to be transferred. All the information is preset by the CPU 11.

Figure 12:
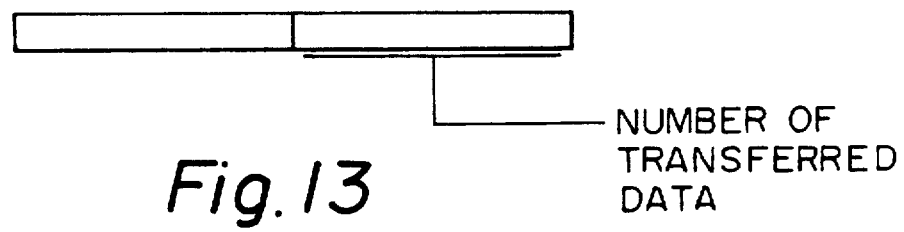
Figure 13:
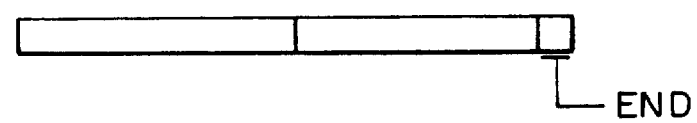

As shown in FIG. 12, a bit denoted by a symbol END is written in the register 44 by the DMA sequential control circuit 600, which is described later.

The operation of the construction of FIG. 9, is as follows.

The access control circuit 400 makes one of the output bits of the aforementioned 8 bits BR1U, BR2U, BR3U, BR4U, BR1L, BR2L, BR3L and BR4L, which was determined by the preset values UPS, LVA, and LVB, ON when receiving a bus access request signal BRQ from the corresponding I/O device, and outputs a bus access acknowledge signal BAV to the I/O device when one of the input bits of the aforementioned 8 bits BA1U, BA2U, BA3U, BA4U, BA1L, BA2L, BA3L, and BA4L, corresponding to one of the above outputs bits, becomes ON.

For example, when the port unit 31 is assigned to (connected to) the I/O device 25 (A), and assuming that the priority level is set by the aforementioned two bits LVA and LVB, and the aforementioned information UPS indicating a partial bus requested to be used by the port unit, corresponds to the internal bus request signal BR3U, the access control circuit 400 in that port unit 31 makes the output bit of the internal bus request signal BR3U, ON when receiving a bus access request signal BRQ from the corresponding I/O device, and sends the bus access acknowledge signal BAV to the I/O device 25 (A), when an input bit BA3U becomes ON.

As shown in FIG. 8, the data buffer circuit 501 is connected to the UP or LOW I/O bus 210 or 200 in the right side, and is connected to the UP bus 110 in the left side. The data buffer circuit 502 is also connected to the same UP I/O bus 210 or the LOW I/O bus 200 as the data buffer circuit 501 on the right side, and is connected to the LOW bus 100 on the left side. The DMA sequential control circuit 600 controls data transfer between the I/O device 25, which is connected through the UP or LOW I/O bus 210 or 200 to its own port unit, and the data buffer memories 201 and 202, through the data buffer circuits 501 and 502.

Figure 14:
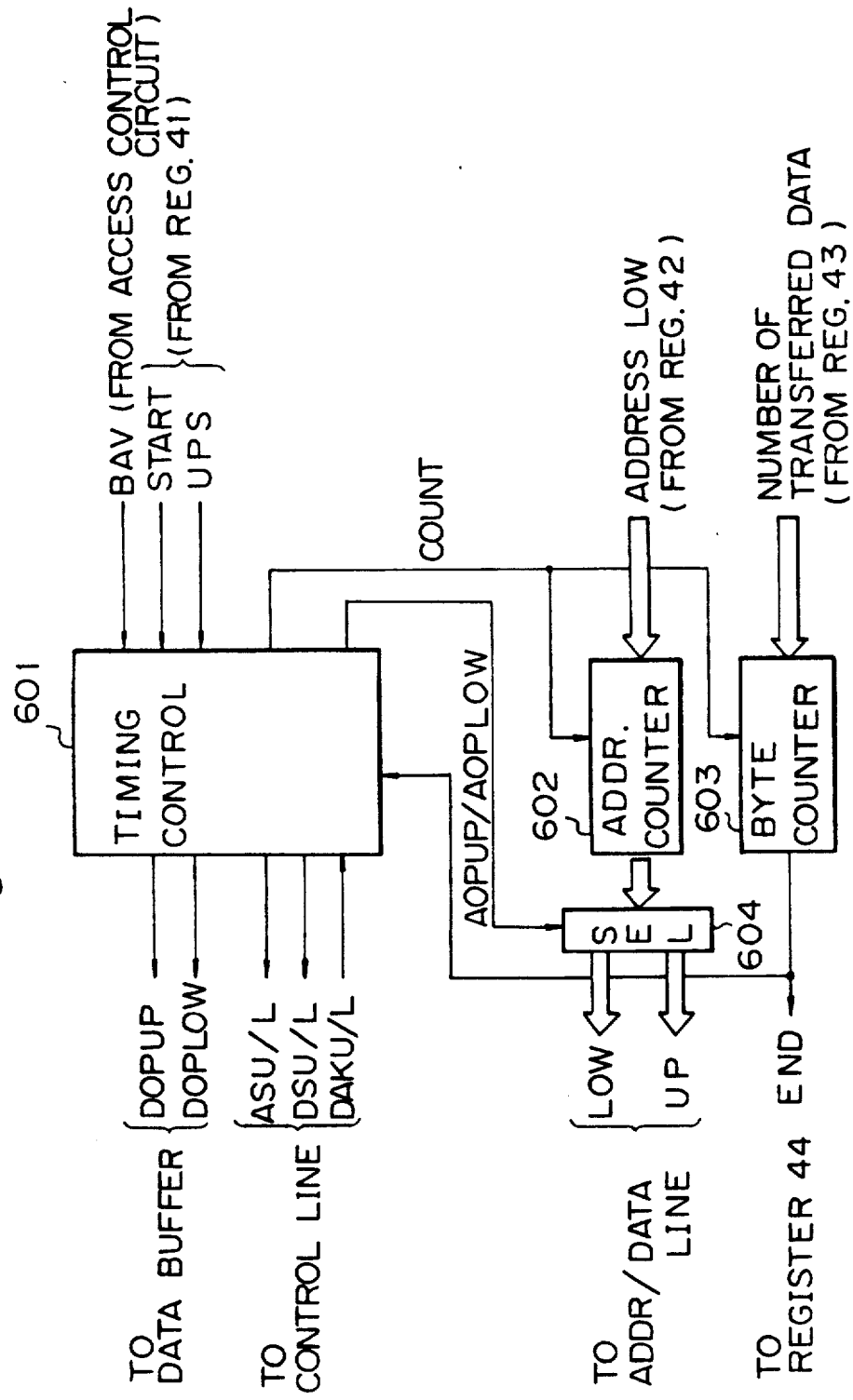
FIG. 14 shows the construction of the DMA sequential control circuit 600 in FIG. 9.

FIG. 14 shows the construction of the DMA sequential control circuit 600.

In FIG. 14, reference numeral 601 denotes a timing control circuit, 602 denotes an address counter, 603 denotes a byte counter, and 604 denotes a selector.

The aforementioned bus access acknowledge signal BAV, the signals START and UPS (each is one bit of the output of the register 41), and the data acknowledge signals DAKU and DAKL (each of which is output from the corresponding one of the data buffer memories 201 and 202, respectively, when transferred data is written in the corresponding one of the data buffer memories 201 and 202), are input to the timing control circuit 601. The timing control circuit 601 generates the aforementioned data buffer circuit control signal DOP UP or DOP LOW, the aforementioned address strobe signal ASU or ASL, the aforementioned data strobe signal DSA or DSL, a count up signal COUNT for the address counter 602 and the byte counter 603, and a select signal AOP UP or AOP LOW, according to the above input signals.

The aforementioned address ADDRESS, which has been preset by the CPU 11 in the register 42, is set in the address counter 602 as an initial value, and the aforementioned number of data (bytes) to be transferred, which has been preset by the CPU 11 in the register 43, is set in the byte counter 603 as an initial value.

The count in the address counter 602 is incremented when the count up signal COUNT becomes ON, and the count in the byte counter 603 is decremented when the count up signal COUNT becomes ON. When all data has been transferred, the count of the byte counter 603 becomes zero, and the output indicating the zero count in the byte counter 603 is sent to the timing control circuit 601 and the register 44. In the register 44, this output makes the aforementioned bit shown by the symbol END in FIG. 12, "1".

The selector 604 outputs the content (count) of the address counter 602, on the UP bus 110 when the signal AOP UP is ON, or on the LOW bus 100 when the signal AOP LOW is ON.

Figure 15:
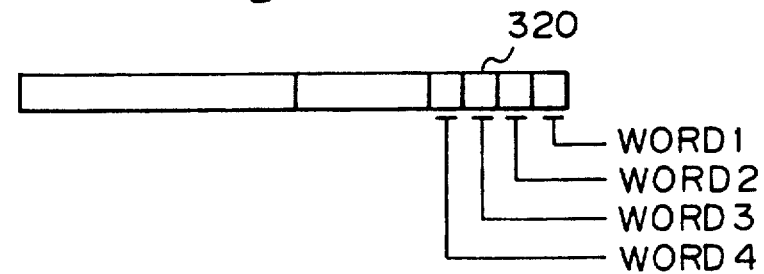
FIG. 15 shows a content of an arbitration mode register 320 in the internal bus arbiter 300 in the construction of FIG. 8.

FIG. 15 shows a part of the content of an arbitration mode register 320 which is provided in the internal bus arbiter 300 in the construction of FIG. 8. These values are also preset by the CPU 11.

The content of the arbitration mode register 320 indicates whether each of the priority levels are assigned to an I/O device having a port size of 16 bits or an I/O device having a port size of 8 bits. WORD1 is for the priority level 1, WORD2 is for the priority level 2, WORD3 is for the priority level 3, and WORD4 is for the priority level 4.

All of the port units 31 to 38 provided in this embodiment each have a port size of 8 bits, and therefore, and I/O device having a port size of 16 bits must be connected to the UP and LOW buses 110 and 100 through two of the port units 31 to 38. When, for example, the port units 37 and 38 are assigned to the I/O device 30 having a port size of 16 bits, the upper side 8 bits of the port of the I/O device 30 is connected to the UP bus 110 through the UP I/O bus 210 and the port unit 37 (for example), and the lower side 8 bits of the port of the I/O device 30 is connected to the LOW bus 100 through the LOW I/O bus 200 and the port unit 38 (for example), and the same priority level is assigned to both the port units 37 and 38, because the priority level is assigned for use of the buses 110 and 100 by the I/O device 30. As described later in detail, the internal bus arbiter 300 sends out a bus grant signal for a priority level assigned to an I/O device having a port size of 16 bits, only when both the UP and LOW buses 110 and 100 are simultaneously granted for the priority level which is assigned to the I/O device.

Therefore, the arbitration mode register 320 realizes a part of the aforementioned combination grant gate means 8 in FIG. 5.

FIG. 16 shows a construction realizing the internal bus arbiter 300 in the construction of FIG. 8.

In FIG. 16, reference numerals 311 to 313, 321 to 324, 370, 391 to 393, and 397 denote AND gates, 331 to 334 denote J-K type flip-flop circuits, 350 denotes a flip-flop circuit, 360 and 396 denote inverters, 380 denotes a NOR gate, and 390, 394 and 395 denote OR gates.

Although not explicitly shown in FIG. 16, the construction in the region shown by a dashed line 311' is similar to the construction shown in the region enclosed by a dashed line 310' and each of the constructions in the region shown by dashed lines 83, 82, and 81 is similar to the construction shown in the region enclosed by a dashed line 84.

The circuit construction in the dashed line 311' realizes an arbitration circuit for four different priority levels which carries out the bus arbitration for use of the UP bus 110, and similarly, the circuit in a dashed line 310' carries out the bus arbitration for use of the LOw bus 100, i.e., the construction 311' and 310' each realizes the partial bus arbitration means in FIG. 2 for the UP bus 110 and the LOW bus 100, respectively, and also corresponds to the aformentioned internal bus arbiter for an upper side 311 and for a lower side 310, respectively.

The aforementioned data strobe signal DSU is input to the flip-flop circuit 350 as a set input, and the output of the construction consisting of the flip-flop circuit 350, the inverter 360, and the AND gate 370 (the output of the AND gate 370), is "1" only at the end of the "1" data strobe signal DSU, and is supplied to the J-K type flip-flop circuits 331 to 334 as a reset pulse.

The Q output of each of the J-K type flip-flop circuits 331 to 334, shown by BA4U', BA3U', BA2U', and BA1U', are intermediate arbitration results before the function of the aforementioned combination grant gate means 8 in FIG. 5 which operates in the next stage, and are input to the circuit denoted by 84, 83, 82, and 81, which realize the combination grant gate means.

The output of the OR gate 390 shows an OR logic result of the above four Q outputs of the J-K type flip-flop circuits 331 to 334 BA4U', BA3U', BA2U', and BA1U', and the output of the OR gate 390 is applied to one input terminal of the NOR gate 380, the output of the NOR gate 380 is applied to one input terminal of each of the four AND gates 321 to 324, and the output of each of the AND gates 321 to 324 is applied to the J input of the corresponding one of the J-K type flip-flop circuits 331 to 334. Therefore, as long as one of the outputs BA4U', BA3U', BA2U', and BA1U' is "1", none of the other outputs BA4U', BA3U', BA2U', and BA1U' can become "1".

The aforementioned output of an AND gate 370 is applied to the other input terminal of the NOR gate 380, so that both of the J and K nputs of each of the J-K type flip-flop circuits 331 to 334 do not become "1" at the same time.

The internal bus request signal BR4U is applied to the other input terminal of the AND gate 324, and each of the other internal bus request signals BR3U, BR2U, and BR1U is applied to one input terminal of the corresponding one of the AND gates 311 to 313. Each of the AND gates 311 to 313 receives the inverted level of the internal bus request signal or signals each having a priority level higher than its own priority level, in the other input terminal or terminals. The output of each of the AND gates 311 to 313 is applied to the other input terminal of the corresponding one of the four AND gates 321 to 324.

Therefore, each internal bus request signal can be applied to the J input terminal of the corresponding one of the J-K type flip-flop circuits 331 to 334 when the internal bus request of a priority level higher than its own priority level is not active (ON).

Thus, an arbitration circuit for four different priority levels for use of the UP bus 110, is realized by the construction 311'.

Similarly, an arbitration circuit for four different priority levels for use of the LOW bus 100, is realized by the construction 310'.

For each priority level i (where i=1 to 4), when the corresponding output WORD i from the arbitration mode register 320 in the internal bus arbiter 300 is "0", this means that the priority level is assigned to an I/O device having a port size of 8 bits, or when the corresponding output WORD i is "1", this means that the priority level is assigned to an I/O device having a port size of 16 bits.

In the circuit shown in 84, the output WORD 4 is applied to one input terminal of the AND gate 392 and the inverter 396. The intermediate arbitration result for the UP bus 110 BA4U' is applied to one input terminal of each of the AND gates 397 and 393, and the intermediate arbitration result for the LOW bus 110 BA4L' is applied to one input terminal of each of the AND gates 397 and 391.

The output of the inverter 396 is applied to the other input terminal of each of the AND gates 393 and 391. The output of the AND gate 392 is applied to one terminal of each of the OR gates 395 and 394. The output of the AND gate 393 is applied to the other terminal of the OR gate 395, and the output of the AND gate 391 is applied to the other terminal of the OR gate 394. The output of the OR gates 395 becomes and internal bus grant signal for the UP bus 110, and the output of the OR gates 394 becomes an internal bus grant signal for the LOW bus 100.

When WORD 4 is "1", one input of the AND gate 392 is "1". When both the intermediate arbitration results BA4U' and BA4L' are "1" (where the aforementioned active or ON state corresponds to "1"), the output of the AND gate 397 is "1", and this output is applied to the AND gate 392 making the output of the AND gate 392 become "1". Therefore, in this case, both the internal bus grant signals for the UP bus 110 and for the LOW bus 100 BA4U and BA4L become ON.

When WORD 4 is "0", the output of the AND gate 397 is "0", and thus the output of the AND gate 392 is "0". On the other hand, each of the intermediate arbitration results BA4U' and BA4L' can pass the corresponding one of the AND gates 393 and 391. Therefore, in this case, the internal bus grant signal for the UP bus 110 BA4U equals the corresponding intermediate arbitration result BA4U', and the internal bus grant signal for the LOW bus 100 BA4L equals the corresponding intermediate arbitration result BA4L'.

Each of the circuits 83, 82, and 81 for the priority levels 3, 2, and 1, respectively, operates similarly.

Figure 17:
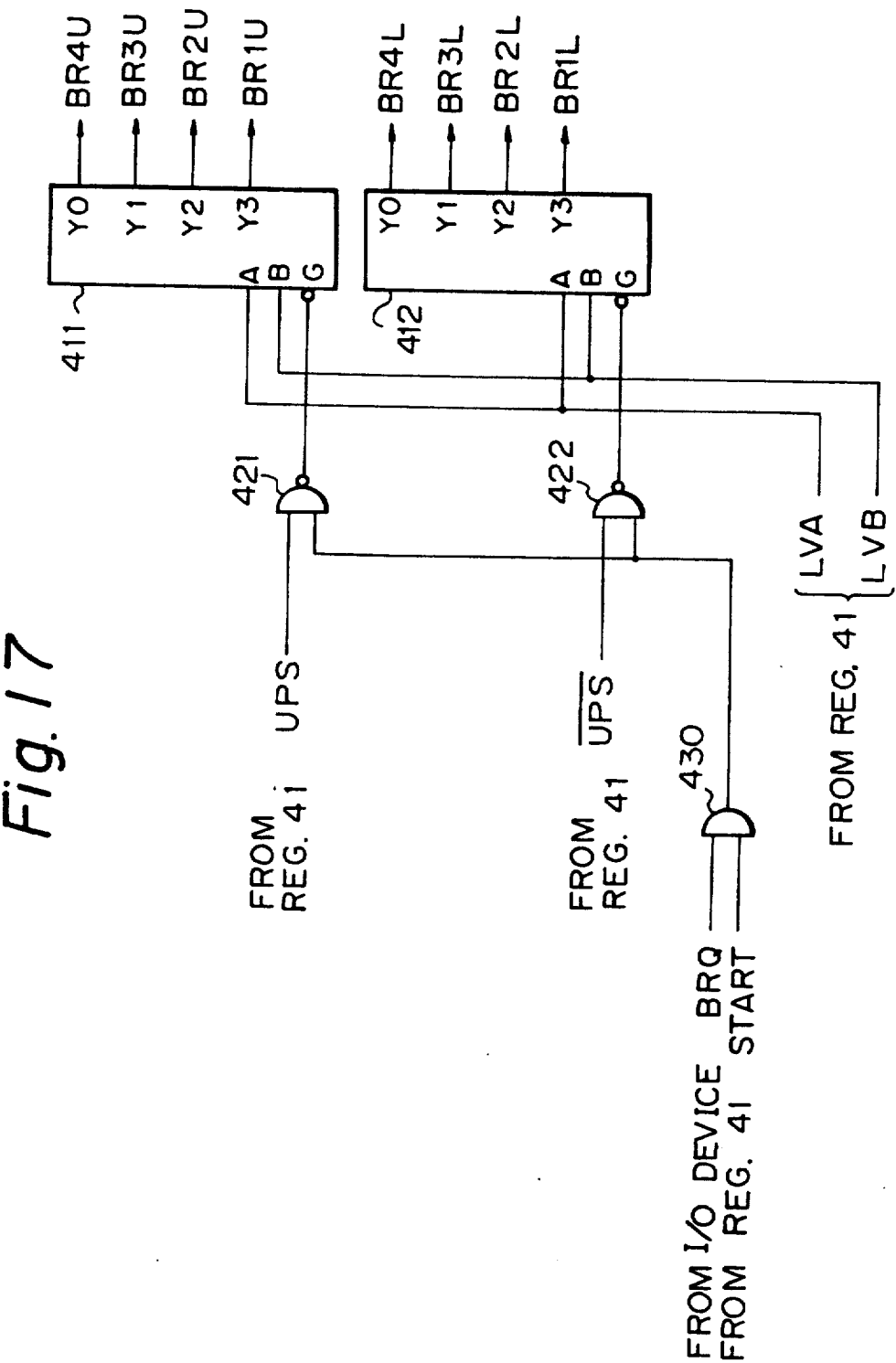
FIGS. 17 and 18 show the construction of the access control circuit 400 in the construction of FIG. 9.
Figure 18:
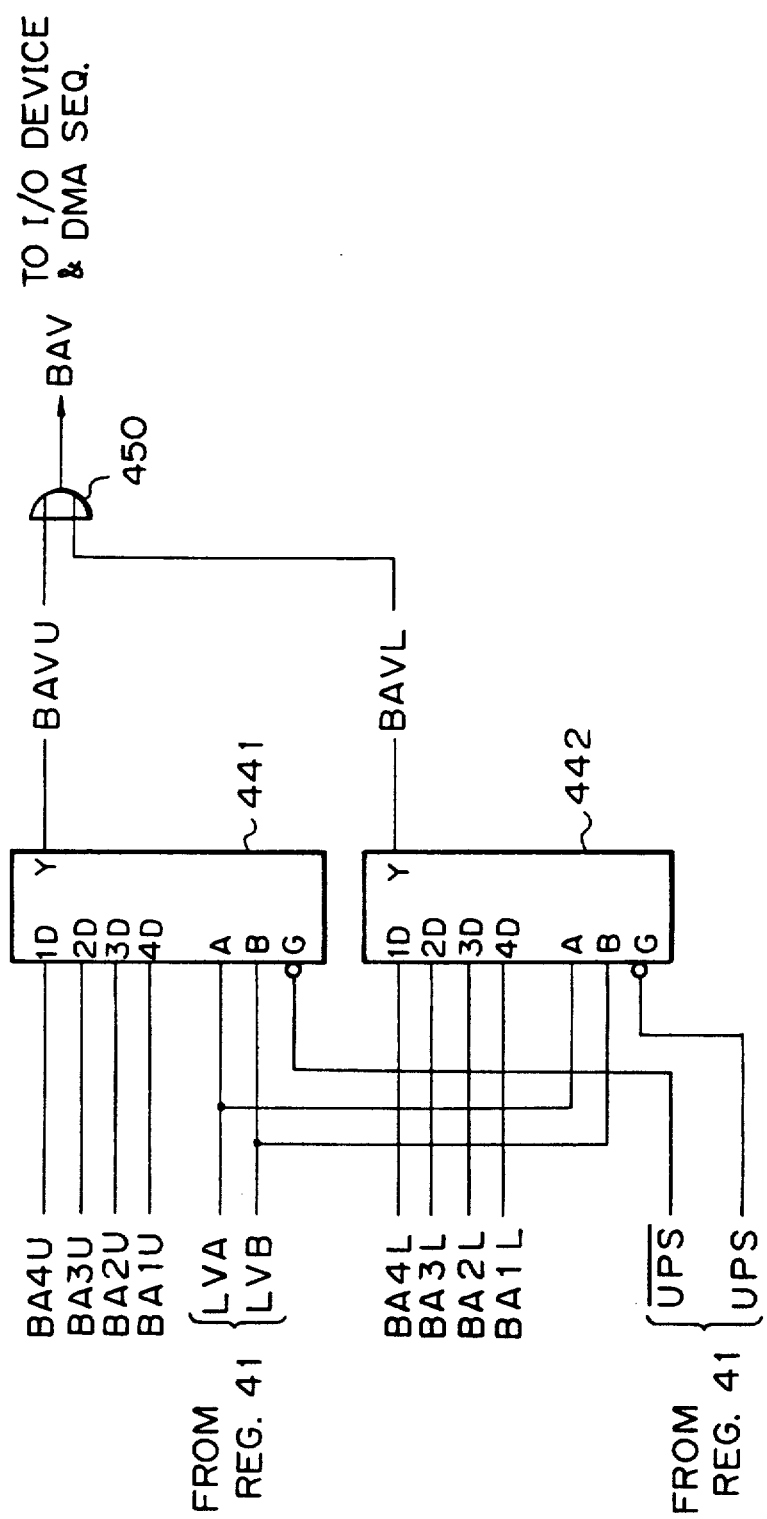

FIGS. 17 and 18 show the construction of the access control circuit 400 in the construction of FIG. 9.

The construction of FIG. 17 corresponds to the aforementioned bus request outputting means $22_j$ in FIG. 2.

In FIG. 17, 411 and 412 denote decoders, 421 and 422 denote NOR gates, and 430 denotes an AND gate.

The signal START and the bus access request signal BRQ from the corresponding I/O device are applied to the two input terminals of the AND circuit 430. The output of the AND gate 430, then, is applied to one input terminal of each of the NAND gates 421 and 422.

One output UPS of the register 41 is applied to the other terminal of the NAND gate 421, and the inversion of the output UPS is applied to the other terminal of the NAND gate 422. The output of the NAND gate 421 is applied to a negative logic gate input terminal denoted by G in the decoder 411, and the output of the NAND gate 422 is applied to a negative logic gate input terminal G in the decoder 412.

Each of the decoders 411 and 412 has control input terminals consisting of two bits and denoted by A and B, and the two bits of the aforementioned outputs LVA and LVB of the register 41, are each applied to the control input terminals A and B, respectively, in both the decoders 411 and 412. Each of the decoders 411 and 412 has four output terminals denoted by $Y_1$, $Y_2$, $Y_3$, and $Y_4$. The four bits output from the decoder 411 $Y_1$, $Y_2$, $Y_3$, $Y_4$ are the internal bus request signals for the UP bus 110 BR4U, BR3U, BR2U, and BR1U, and the four bits output from the decoder 412 $Y_1$, $Y_2$, $Y_3$, $Y_4$ are the internal bus request signals for the LOW bus 100 BR4L, BR3L, BR2L, and BR1L.

The output of the AND gate 430 becomes "1" when the signal START is ON, and the bus access request signal BRQ from the corresponding I/O device becomes ON.

Therefore, when UPS="1", only the decoder 411 operates, and when UPS="0", only the decoder 412 operates. In each case, one of the four outputs (BR4U, BR3U, BR2U, and BR1U, or BR4L, BR3L, BR2L, and BR1L) corresponding to the priority level determined by the signals LVA and LVB, becomes ON.

The construction of FIG. 18 corresponds to the aforementioned bus grant receiving means $21_j$ in FIG. 2.

In FIG. 18, 441 and 442 denote selectors, and 450 denotes an OR gate.

One output UPS of the register 41 is applied to a negative logic gate input terminal G in the selector 442, and the inversion of the output UPS is applied to a negative logic gate input terminal denoted by G in the selector 441.

Each of the selectors 441 and 442 has control input terminals consisting of two bits and denoted by A and B, and the two bits of the outputs LVA and LVB are each applied to the control input terminals A and B, respectively, in both the selectors 441 and 442. Each of the selectors 441 and 442 has four input terminals denoted by 1D, 2D, 3D, and 4D, and the internal bus grant signals BA4U, BA3U, BA2U, and BA1U are each input into the four input terminals in the selector 441, and the internal bus grant signals BA4L, BA3L, BA2L, and BA1L are each input into the four input terminals in the selector 442. The output of the selector 441 denoted by BAVU and the output of the selector 442 denoted by BAVL, are input into the OR gate 450. The output of the OR gate 450 becomes the bus access grant signal BAV.

Therefore, when UPS="0", only the selector 441 operates, and when UPS="0", only the selector 442 operates. In each case, each of the selectors selects only one of the four inputs (BA4U, BA3U, BA2U, and BA1U, or BA4L, BA3L, BA2L, and BA1L) corresponding to the priority level determined by the signals LVA and LVB. Thus, only the internal bus grant signal of the priority level assigned to its own port unit can be received, and then the corresponding bus access grant signal BAV is sent to the corresponding I/O device and to the DMA sequential control circuit 600.

Figure 19:
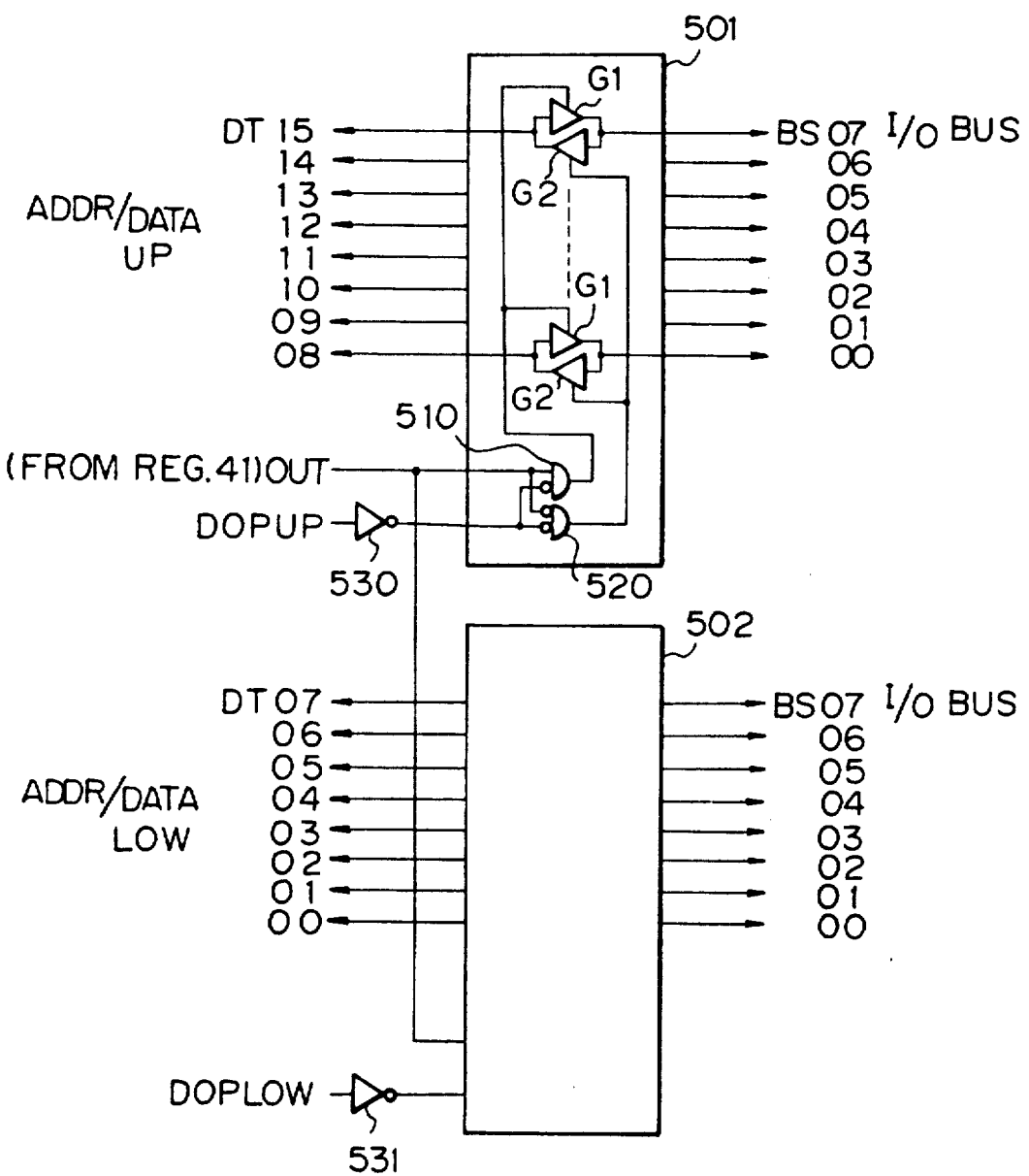
FIG. 19 shows the construction of the two-way data buffer circuits 501 and 502.

FIG. 19 shows the construction of the two-way data buffer circuits 501 and 502.

In FIG. 19, each G1 and G2 denotes a tri-state gate, 510 and 520 denote AND gates, and 530 and 531 denote inverters.

The two-way data buffer circuit for an upper side 501 is connected on one side to the UP or LOW I/O bus 210 or 200, and is removably connected on the other side to the UP bus 110. The two-way data buffer circuit for a lower side 502 is connected on one side to the UP or LOW I/O bus 210 or 200, and is removably connected on the other side to the LOW bus 100.

The aforementioned data buffer circuit control signal DOP UP is inverted in the inverter 530, and is then applied to one of the inverted input terminals of each of the AND gates 520 and 510. The output OUT from the register 41 is applied to the other input terminal of the AND gate 510, and in parallel is applied to the other inverted input terminal of the AND gate 520.

A two-way buffer circuit consisting of the tri-state gates G1 and G2 is provided for each bit of the data signal lines connecting the UP bus 110 and the UP or LOW I/O bus 210 or 200. The output of the AND gate 510 is applied to one of the tri-state gates G1 and G2 which is in the direction from the UP bus 110 to the UP or LOW I/O bus 210 or 200, as a control signal, and the output of the AND gate 520 is applied to the other of the tri-state gates G1 and G2 which is in the direction from the UP or LOW I/O bus 210 or 200 to the UP bus 110, as a control signal.

The two-way buffer circuit for a lower side 502 has a construction similar to the above circuit 501, except that the aforementioned data buffer circuit control signal DOP LOW, instead of DOP UP, is applied to the inverter 531.

When the signal DOP UP is "1", the two-way data buffer circuit for an upper side 501 operates, i.e., the UP bus 110 is connected to the UP or LOW I/O bus 210 or 200, or when the signal DOP LOW is "1", the two-way data buffer circuit for a lower side 502 operates, i.e., the LOW bus 100 is connected to the UP or LOW I/O bus 210 or 200. When the signal OUT is "1", the tri-state gates in the direction from the UP bus 110 to the UP or LOW I/O bus 210 or 200 in both the two-way data buffer circuits 501 and 502 become open, and when the signal OUT is "0", the tri-state gates in the direction from the UP or LOW I/O bus 210 or 200 to the UP bus 110 in both the two-way data buffer circuits 501 and 502 become open.

Figure 20:
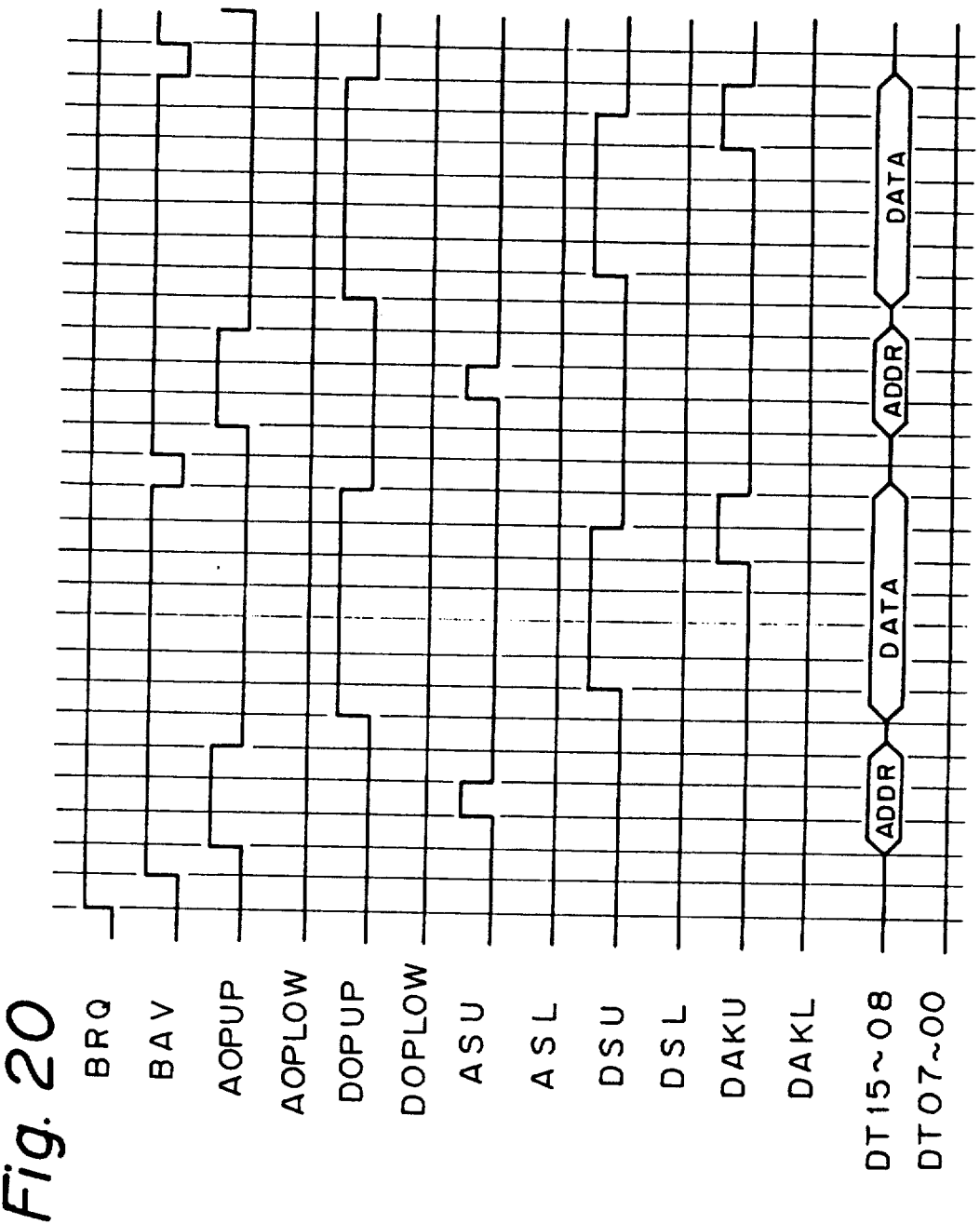
FIG. 20 shows a timing of an operation of data transfer when only the UP bus is used.

FIG. 20 shows the timing of a data transfer operation when only the UP bus is used.

For example, suppose data is transferred from an I/O device to the data buffer memory 201 through the UP bus 110.

First, an I/O device makes the output of the bus access request signal BRQ, ON. Next, through the aforementioned process, the corresponding bus access acknowledge signal BAV to the I/O device is made ON.

When the DMA sequential control circuit 600 receives the bus access acknowledge signal BAV, the timing control circuit 601 in the DMA sequential control circuit 600 outputs the select signal AOP UP, and accordingly, the DMA sequential control circuit 600 outputs the address in the address counter 602 on the UP bus 110, and the address is applied to the data buffer memory 201.

After a predetermined time has elapsed, the timing control circuit 601 outputs the address strobe signal ASU through the control lines 120 to the data buffer memory 201, and the applied address is read by the data buffer memory 201.

After the above process, the timing control circuit 601 in the DMA sequential control circuit 600 outputs the buffer circuit control signal DOP UP, and accordingly, data on the I/O bus passes through the DMA sequential control circuit 600 and the UP bus 110, and is then applied to the data buffer memory 201.

After a predetermined time has elapsed, the timing control circuit 601 outputs the data strobe signal DSU through the control lines 120 to the data buffer memory 201, and therefore, the applied data is written in the data buffer memory 201.

When the data is written in the data buffer memory 201, the data buffer memory 201 returns the data acknowledge signal DAKU through the control lines 120 to the DMA sequential control circuit 600. When the timing control circuit 601 in the DMA sequential control circuit 600 receives the data acknowledge signal DAKU, the above data strobe signal DSU is turned OFF, and the count up signal COUNT is output from the timing control circuit 601, and is then applied to the address counter 602 and the byte counter 603, and the address and the number of bytes of the remaining data are renewed, and then the next process of the data transfer similar to that described above is repeated.

Figure 21:
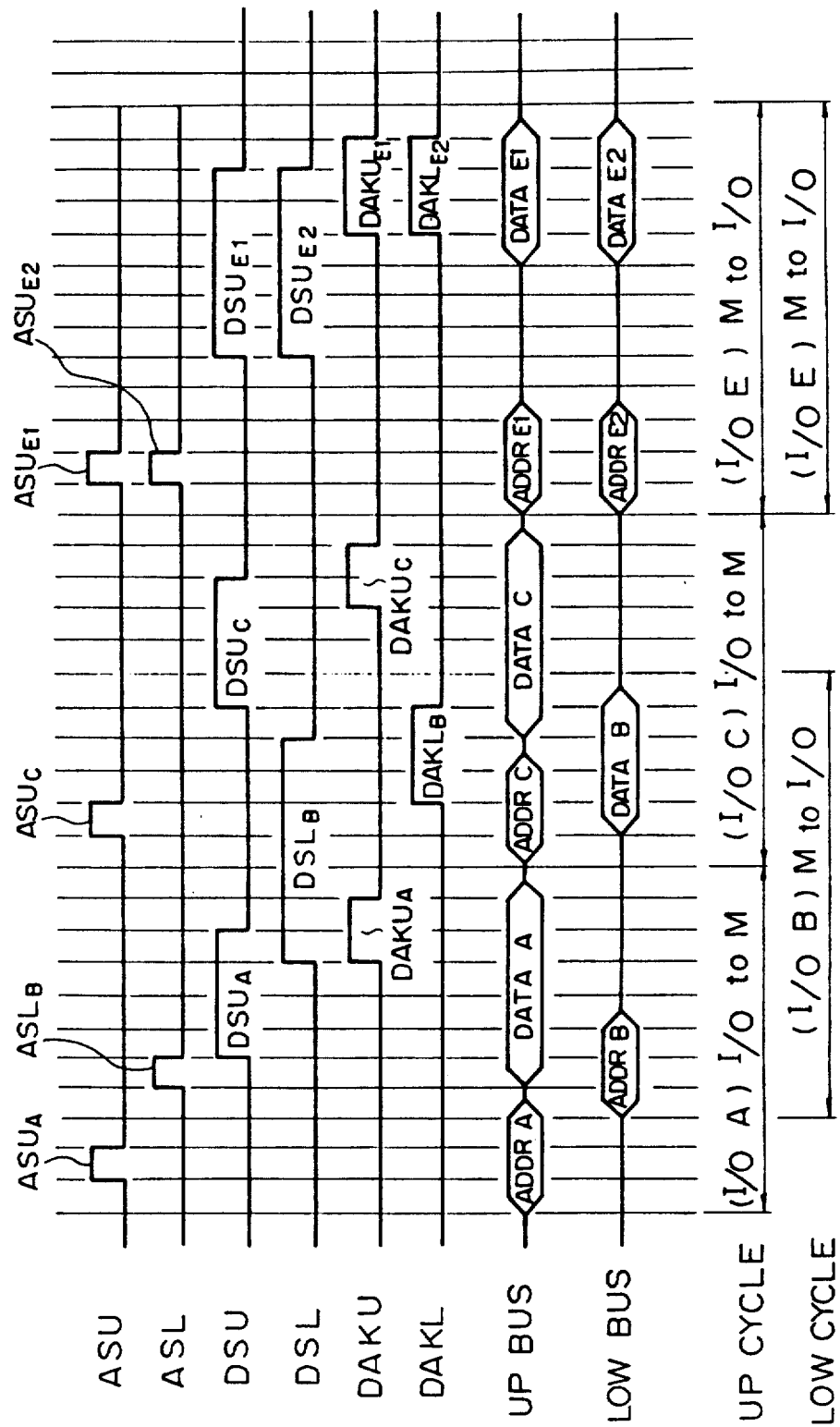
FIG. 21 shows a timing of an operation of data transfer wherein both the UP and LOW buses are used according to the present invention.

FIG. 21 shows the timing of a data transfer operation wherein both the UP and LOW buses are used at the same time according to the present invention.

First, the I/O device A having a port size of 8 bits is granted use of the UP bus 110, and accordingly, the address ADDR A is output through the port unit assigned for the I/O device A and the UP bus 110 to the data buffer memory 201, followed by the address strobe signal $ASU_A$ output from the port unit through the control lines 120, and the address ADDR A is then input into a control circuit (not shown) of the data buffer memory 201.

Next, DATA A from the I/O device A is applied through the above port unit and the UP bus 110 to the data buffer memory 201, followed by the data strobe signal $DSU_A$ output from the port unit through the control lines 120, and the data DATA A is then written into the data buffer memory 201.

When the data DATA A is written in the data buffer memory 201, the data buffer memory 201 returns the data acknowledge signal $DAKU_A$ through the control lines 120 to the DMA sequential control circuit 600. When the timing control circuit 601 in the DMA sequential control circuit 600 receives the data acknowledge signal $DAKU_A$, the above data strobe signal $DSU_A$ is turned OFF.

During the above operation for the I/O device A, the I/O device B having a port size of 8 bits is granted to use the LOW bus 100, and accordingly, the address ADDR B is output through the port unit assigned for the I/O device B and the LOW bus 100 to the data buffer memory 202, followed by the address strobe signal $ASU_B$ output from the port unit through the control lines 120, and the address ADDR B is then input into a control circuit (not shown) of the data buffer memory 202.

Next, data DATA B from the I/O device B is applied through the above port unit and the LOW bus 100 to the data buffer memory 202, followed by the data strobe signal $DSU_B$ output from the port unit through the control lines 120, and the data DATA B is then written into the data buffer memory 202.

When the data DATA B is written in the data buffer memory 202, the data buffer memory 202 returns the data acknowledge signal $DAKU_B$ through the control lines 120 to the DMA sequential control circuit 600. When the timing control circuit 601 in the DMA sequential control circuit 600 receives the data acknowledge signal $DAKU_B$, the above data strobe signal $DSU_B$ is turned OFF.

If during the above operation for the I/O device B, the I/O device C having a port size of 8 bits is granted use of the UP bus 110, accordingly, the address ADDR C is output through the port unit assigned for the I/O device C and the UP bus 110 to the data buffer memory 201, followed by the address strobe signal $ASU_C$ output from the port unit through the control lines 120, and the address ADDR C is then input into the control circuit of the data buffer memory 201.

Next, data DATA C from the I/O device C is applied through the above port unit and the UP bus 110 to the data buffer memory 201, followed by the data strobe signal $DSU_C$ output from the port unit through the control lines 120, and the data DATA C is then written into the data buffer memory 201.

When the data DATA C is written in the data buffer memory 201, the data buffer memory 201 returns the data acknowledge signal $DAKU_C$ through the control lines 120 to the DMA sequential control circuit 600. When the timing control circuit 601 in the DMA sequential control circuit 600 receives the data acknowledge signal $DAKU_C$, the above data strobe signal $DSU_C$ is made OFF.

If after the above data transfer from the I/O buses A, B, and C has been completed, the I/O device E having a port size of 16 bits requests use of both the UP and LOW buses 110 and 100 through two assigned port units E1 and E2, and the I/O device E is granted use of the UP and LOW buses 110 and 100, accordingly, the address ADDR E1 is output through the port unit E1 and the UP bus 110 to the data buffer memory 201, and at the same time, the address ADDR E2 is output through the port unit E2 and the LOW bus 100 to the data buffer memory 202, and therefore the address strobe signals $ASU_{E1}$ and $ASU_{E2}$ are each output from the corresponding one of the port units E1 and E2, respectively, and each are applied to the corresponding one of the data buffer memories 201 and 202 respectively, through the control lines 120.

Next, an upper 8 bits of the DATA E1 of the original 16 bit data DATA E from the I/O device E is applied through the above port unit E1 and the UP bus 110 to the data buffer memory 201, and at the same time, a lower 8 bits of DATA E2 of the original 16 bit data DATA E from the I/O device E is applied through the above port unit E2 and the LOW bus 100 to the data buffer memory 202. Next, the data strobe signal $DSU_{E1}$ from the port unit E1 and the data strobe signal $DSU_{E2}$ from the port unit E2 are each output and applied to the corresponding one of the data buffer memories 201 and 202, respectively, through the control lines 120, and thus the 16 bit data DATA E=DATAE1+DATA E2 is written in the data buffer memories 201 and 202.

When the data is written in the data buffer memories 201 and 202, both the data buffer memories 201 and 202 each return the data acknowledge signals $DAKU_{E1}$ and $DAKU_{E2}$, respectively, through the control lines 120 to the DMA sequential control circuit 600 in the corresponding one of the port units E1 and E2. When the timing control circuit 601 in the DMA sequential control circuit 600 in each port unit receives the corresponding one of the data acknowledge signals $DAKU_{E1}$ and $DAKU_{E2}$, the above data strobe signals $DSU_{E1}$ and $DSU_{E2}$ are turned OFF.

I claim:

1. A bus arbitration system disposed between a plurality of devices for granting use of a system bus having a data bus size equal to or larger than a port size of each of said plurality of devices, said system bus comprises a plurality of partial buses, said bus arbitration system comprising:

each of said plurality of partial buses comprises a at least one of a plurality of signal lines of said system bus, said at least one signal line provided exclusively for each partial bus, each of said partial buses functioning as an individual bus, and a sum of data bus sizes of all of said partial buses equals the data bus size of said system bus;

a plurality of port units each of which is connected, on a first side, to a corresponding one of said plurality of partial buses, wherein more than one port unit is connected to each partial bus, and each of said devices is connected to a corresponding one or more of said plurality of port units on a second side of said corresponding one or more of said plurality of port units so that the port size of said each device equals a total port size of said corresponding one or more of said plurality of port units connected to said each device; and an arbitration means which comprises a plurality of partial bus arbitration means, each of said plurality of partial bus arbitration means connected to a corresponding one of said partial buses, and connected through respective control lines with each of said port units connected to said corresponding one of the partial buses and each of the partial bus arbitration means carries out an arbitration between said plurality of port units connected to the corresponding one partial bus, for granting use of said corresponding one partial bus;

each of said port units sends a bus request signal identifying itself to one of said partial bus arbitration means, upon receiving a request for use of the partial bus corresponding to said each port unit from the device connected to said each port unit;

each of said plurality of partial bus arbitration means, after carrying out arbitration, outputs a respective grant signal which grants use of said corresponding partial bus, for one port unit among the port units which sent said bus request signal to said each partial bus arbitration means; and said arbitration means further comprises a combination grant gate means coupled to said plurality of partial bus arbitration means for simultaneously outputting grant signals to a combination of port units for a bus request from a device connected to said combination of port units.

2. A bus arbitration system according to claim 1, wherein each port unit comprises:

a gate for connecting the device corresponding to said each port unit to the partial bus corresponding to said each port unit; and a bus grant receiving means connected to said gate for enabling said gate upon receiving said grant signal.

3. A bus arbitration system according to claim 1, further comprising:
   a data buffer memory connected to each of said partial buses for temporarily holding data being transferred to or transferred from said devices.

4. A bus arbitration system according to claim 1, wherein
   said bus request signal includes information of a priority level assigned to its own port unit; and
   said arbitration is carried out based on said priority level.

* * * * *